United States Patent
Chung et al.

(10) Patent No.: US 12,539,264 B2
(45) Date of Patent: Feb. 3, 2026

(54) COMPOSITION COMPRISING PENTAPEPTIDE AS ACTIVE INGREDIENT

(71) Applicant: CAREGEN CO, LTD., Anyang-si (KR)

(72) Inventors: Yong Ji Chung, Anyang-si (KR); Eun Mi Kim, Anyang-si (KR); Eung Ji Lee, Anyang-si (KR)

(73) Assignee: CAREGEN CO, LTD., Anyang-si (KR)

( * ) Notice: Subject to any disclaimer, the term of this patent is extended or adjusted under 35 U.S.C. 154(b) by 408 days.

(21) Appl. No.: 18/009,373

(22) PCT Filed: Jun. 11, 2021

(86) PCT No.: PCT/KR2021/007323
§ 371 (c)(1),
(2) Date: Dec. 9, 2022

(87) PCT Pub. No.: WO2021/251789
PCT Pub. Date: Dec. 16, 2021

(65) Prior Publication Data
US 2023/0218498 A1    Jul. 13, 2023

(30) Foreign Application Priority Data

Jun. 12, 2020   (KR) ................. 10-2020-0071659
Jun. 12, 2020   (KR) ................. 10-2020-0071660

(51) Int. Cl.
| | | |
|---|---|---|
| A61K 8/64 | (2006.01) | |
| A61K 38/08 | (2019.01) | |
| A61P 29/00 | (2006.01) | |
| A61Q 15/00 | (2006.01) | |

(52) U.S. Cl.
CPC ............ *A61K 8/64* (2013.01); *A61K 38/08* (2013.01); *A61P 29/00* (2018.01); *A61Q 15/00* (2013.01)

(58) Field of Classification Search
None
See application file for complete search history.

(56) References Cited

U.S. PATENT DOCUMENTS

| | | |
|---|---|---|
| 8,318,898 B2 | 11/2012 | Fasel et al. |
| 11,246,907 B2 | 2/2022 | Otterlei |
| 11,306,121 B2 | 4/2022 | Chung et al. |
| 2016/0279193 A1 | 9/2016 | Otterlei et al. |
| 2016/0289272 A1 | 10/2016 | Otterlei |
| 2021/0246165 A1 | 8/2021 | Chung et al. |

FOREIGN PATENT DOCUMENTS

| | | |
|---|---|---|
| CN | 112367967 A | 2/2021 |
| EP | 3815674 A1 | 5/2021 |
| JP | 7110405 B2 | 8/2022 |
| JP | 2023-529465 A | 7/2023 |
| KR | 20090041066 A | 4/2009 |
| KR | 102132274 B1 | 7/2020 |
| WO | 2010078242 A1 | 7/2010 |
| WO | 2015067712 A1 | 5/2015 |

OTHER PUBLICATIONS

International Search Report and Written Opinion of the International Searching Authority for International Patent Application No. PCT/KR2021/007323 mailed Sep. 9, 2021 (10 pages).
Ranoux, MD et al, "Botulinum Toxin Type A Induces Direct Analgesic Effects in Chronic Neuropathic Pain" Annals of Neurology, 2008, 64(3):274-283, Published online in Wiley InterScience (www.interscience.wiley.com), (10 pages).
Yuan, MD et al, "Botulinum toxin for diabetic neuropathic pain" Neurology, 2009, 72:1473-1478, Published online DOI 10.1212/01.wnl.0000345968.05959.cf (8 pages).
Extended European search report issued on Apr. 19, 2023 for the corresponding European Patent Application No. 21822501.9 (7 pages).
Office Action issued on Jan. 23, 2024 for the corresponding Japanese Patent Application No. 2022-576024 ( 6 pages with English Translation).
First Office Action issued on Sep. 30, 2024 for the corresponding Chinese Patent Application No. 202180042038.3 (14 pages including English Translation).

*Primary Examiner* — Anna R Falkowitz
*Assistant Examiner* — Garen Gotfredson
(74) *Attorney, Agent, or Firm* — Merchant & Gould P.C.

(57) ABSTRACT

The present invention related to the use of a composition comprising a pentapeptide as an active ingredient to suppress excessive sweating, to suppress body odor or to prevent or treat pain.

15 Claims, 13 Drawing Sheets

Specification includes a Sequence Listing.

A

PBS Solution (Control) — Pentapeptide

B

SEQUENCE LISTING

```
<160> NUMBER OF SEQ ID NOS: 11

<210> SEQ ID NO 1
<211> LENGTH: 5
<212> TYPE: PRT
<213> ORGANISM: Artificial Sequence
<220> FEATURE:
<223> OTHER INFORMATION: Pentapeptide

<400> SEQUENCE: 1

Lys Phe Leu Ile Lys
1               5
```

```
<210> SEQ ID NO 2
<211> LENGTH: 20
<212> TYPE: DNA
<213> ORGANISM: Artificial Sequence
<220> FEATURE:
<223> OTHER INFORMATION: Forward primer for IL-1alpha

<400> SEQUENCE: 2
gaagtcaggc agaagtgctc                                                    20

<210> SEQ ID NO 3
<211> LENGTH: 20
<212> TYPE: DNA
<213> ORGANISM: Artificial Sequence
<220> FEATURE:
<223> OTHER INFORMATION: Reverse primer for IL-1alpha

<400> SEQUENCE: 3
gtgcacccga ctttgttctt                                                    20

<210> SEQ ID NO 4
<211> LENGTH: 20
<212> TYPE: DNA
<213> ORGANISM: Artificial Sequence
<220> FEATURE:
<223> OTHER INFORMATION: Forward primer for TNF-alpha

<400> SEQUENCE: 4
cgtcagccga tttgctatct                                                    20

<210> SEQ ID NO 5
<211> LENGTH: 20
<212> TYPE: DNA
<213> ORGANISM: Artificial Sequence
<220> FEATURE:
<223> OTHER INFORMATION: Reverse primer for TNF-alpha

<400> SEQUENCE: 5
cggactccgc aaagtctaag                                                    20

<210> SEQ ID NO 6
<211> LENGTH: 20
<212> TYPE: DNA
<213> ORGANISM: Artificial Sequence
<220> FEATURE:
<223> OTHER INFORMATION: Forward primer for IL-1beta

<400> SEQUENCE: 6
caaggagaac caagcaacga                                                    20

<210> SEQ ID NO 7
<211> LENGTH: 20
<212> TYPE: DNA
<213> ORGANISM: Artificial Sequence
<220> FEATURE:
<223> OTHER INFORMATION: Reverse primer for IL-1beta

<400> SEQUENCE: 7
ttggccgagg actaaggagt                                                    20

<210> SEQ ID NO 8
<211> LENGTH: 20
<212> TYPE: DNA
```

```
<213> ORGANISM: Artificial Sequence
<220> FEATURE:
<223> OTHER INFORMATION: Forward primer for COX-2

<400> SEQUENCE: 8
tgagtggtag ccagcaaagc                                               20

<210> SEQ ID NO 9
<211> LENGTH: 20
<212> TYPE: DNA
<213> ORGANISM: Artificial Sequence
<220> FEATURE:
<223> OTHER INFORMATION: Reverse primer for COX-2

<400> SEQUENCE: 9
ctgcagtcca ggttcaatgg                                               20

<210> SEQ ID NO 10
<211> LENGTH: 20
<212> TYPE: DNA
<213> ORGANISM: Artificial Sequence
<220> FEATURE:
<223> OTHER INFORMATION: Forward primer for GAPDH

<400> SEQUENCE: 10
accacagtcc atgccatcac                                               20

<210> SEQ ID NO 11
<211> LENGTH: 20
<212> TYPE: DNA
<213> ORGANISM: Artificial Sequence
<220> FEATURE:
<223> OTHER INFORMATION: Reverse primer for GAPDH

<400> SEQUENCE: 11
tccaccaccc tgttgctgta                                               20
```

COMPOSITION COMPRISING PENTAPEPTIDE AS ACTIVE INGREDIENT

CROSS-REFERENCE TO RELATED APPLICATIONS

This application is a National Stage Application of PCT/KR2021/007323, filed 11 Jun. 2021, which claims benefit of Serial No. 10-2020-0071659, filed 12 Jun. 2020 and also claims benefit of Serial no. 10-2020-0071660, filed 12 Jun. 2020 in Republic of Korea and which applications are incorporated herein by reference. To the extent appropriate, a claim of priority is made to each of the above disclosed applications.

SEQUENCE STATEMENT

This application contains a Sequence Listing, which has been submitted electronically in ASCII format and is hereby incorporated by reference in its entirety. Said ASCII copy, is named Revised-Sequece-Listing-09983-0263FPWO, was created on May 13, 2023 and is 2591 bytes in size.

TECHNICAL FIELD

The present invention relates to the use of a composition comprising a pentapeptide as an active ingredient to suppress excessive sweating, to suppress body odor or to prevent or treat pain.

BACKGROUND ART

Hyperhidrosis is a skin disorder characterized by excessively and abnormally increased perspiration or sweating beyond that necessary for body temperature regulation. Hyperhidrosis is caused by genetic causes or physical or emotional stress, and can be localized throughout the body or in specific areas of the body. When excessive sweating occurs locally on the palms, soles of the feet, face, armpits, or scalp, it is called primary or focal hyperhidrosis. Systemic or secondary hyperhidrosis usually involves the whole body.

Currently, the method of treating hyperhidrosis includes the use of an antiperspirant, ion transfer method to temporarily block the sweat gland, Botox therapy to temporarily block the nerve that stimulates sweating (WO2010-078242), and sweat gland. Among them, in the case of the method of temporarily blocking nerves using botulinum toxin, the paralytic effect is reversible for an average of 6 months, so repeated injections of botulinum toxin are required for this treatment. Since botulinum toxin has a size that can be recognized by the patient's immune-system, an immune response to the drug may be induced. Therefore, there is a need to develop a molecule that has a simpler and more stable molecular structure that does not induce an immune response, has a high sweat-reducing activity, and enables a non-invasive treatment with long-acting and fewer side effects.

On the other hand, body odor occurs when sweat secreted from sweat glands is decomposed by microorganisms or bacteria. In the process of decomposing fat, protein, sebum and contaminants contained in sweat secreted from eccrine sweat glands distributed throughout the body and apocrine sweat glands distributed in areas with a lot of body hair such as armpits by microorganisms or bacteria, an unpleasant body odor such as underarm odor, foot odor, and head odor are generated. In general, methods such as deodorization, being antibacterial, and masking are used to control body odor, but if the wrong scent is used to cover the body odor, it can give off a bad odor and have the opposite effect. In addition, when the deodorant component is used on the skin, only a temporary effect is provided until the next washing after treatment, and there is a hassle of reprocessing after washing Accordingly, as a result of the inventors' earnest efforts to develop a material that can suppress body odor by suppressing the generation of excessive sweat, which can be said to be the root cause of body odor, the present inventors confirmed that the pentapeptide newly synthesized by the present inventors has a stable molecular structure, penetrates through the dermis to the skin tissue, and exhibits high sweat reduction activity, so it can be usefully used for the treatment of hyperhidrosis and control of body odor, and completed the present invention.

On the other hand, pain occurs due to various causes, and if the pain lasts for a long time or the stimulus is too severe, it interferes with daily life and sometimes causes anxiety and fear. In general, pain is called headache, chest pain, abdominal pain, back pain, etc. depending on the site of occurrence, and it is divided into somatic pain, visceral pain, neuropathic pain, psychogenic pain etc. according to the mechanism of occurrence, and into acute pain and chronic pain according to the concept of time. Chronic pain, which has clinical significance, is a complaint of pain that persists for 6 months or longer, despite the absence of a clear cause. Most of the chronic pain is expressed in the form of neuropathic pain characterized by spontaneous pain, allodynia and hyperalgesia, and severe pain is induced even by a slight temperature change or light contact with clothes. Therefore, it causes a significant disturbance in the patient's daily life and does not respond well to various existing treatments.

Currently, invasive treatment methods such as nerve block, and various types of drug treatment methods (opioid drugs, nervous system ion channel activity modulating drugs, anticonvulsants, etc.) are applied for the treatment of pain. However, the above drugs show their effects only when administered in high doses, and even if they are effective in the beginning, resistance arises during long-term use and the effects are often lost. In addition, side effects such as gastrointestinal bleeding, gastrointestinal disorders, and liver damage may result.

Accordingly, a method of using botulinum toxin A as a new treatment that can solve the side effects of existing treatments is being introduced. Ranoux et al. reported reduction of pain and allodynia after intradermal injection of botulinum toxin in patients with post-herpetic pain and postoperative neuropathic pain with mechanical allodynia (Ranoux et al., Annals of Neurology 64(3): 274-283 (2008)), and Yuan et al. reported pain reduction and improvement of sleep disturbance in diabetic neuralgia patients (Yuan et al., Neurology 72:1473-1478(2009)). However, recently there is an increasing number of reports of similar effects compared to placebo administration, so more research results are needed.

On the other hand, since the effect of botulinum toxin is reversible for an average of 6 months, repeated injections are required to treat pain, and since it has a size that can be recognized by the patient's immune system, an immune response to the drug can be induced. Therefore, there is a need to develop a molecule that has a simpler and more stable molecular structure that does not induce an immune response, has a high pain relief activity, and enables a non-invasive treatment with long-acting and fewer side effects.

Accordingly, as a result of the inventors' earnest efforts to develop a new therapeutic agent for pain, the present inventors confirmed that the newly synthesized pentapeptide has a stable molecular structure, penetrates through the dermis to the skin tissue, and exhibits high pain-suppressing activity, so it can be usefully used for pain treatment, and completed the present invention.

DISCLOSURE

Technical Problem

An object of the present invention is to provide a pharmaceutical composition for the prevention or treatment of hyperhidrosis.

Another of the present invention is to provide a method for the prevention or treatment of hyperhidrosis.

Further another object of the present invention is to provide a peptide for the use in the prevention or treatment of hyperhidrosis.

Further another object of the present invention is to provide a composition for the prevention or relief of hyperhidrosis or the suppression of body odor.

Further another object of the present invention is to provide a method for the suppression of body odor.

Further another object of the present invention is to provide a peptide for the use in the suppression of body odor.

Further another object of the present invention is to provide a composition for the pain relief.

Further another object of the present invention is to provide a pharmaceutical composition for the prevention or treatment of paid.

Further another object of the present invention is to provide a method for the prevention or treatment of pain.

Further another object of the present invention is to provide a peptide for the use in the prevention or treatment of pain.

Further another object of the present invention is to provide a quasi-drug composition for the relief or improvement of pain.

Further another object of the present invention is to provide a cosmetic composition for the relief or improvement of pain.

Technical Solution

In order to solve the above problems, one aspect of the present invention provides a pharmaceutical composition for the prevention or treatment of hyperhidrosis comprising a pentapeptide consisting of the amino acid sequence of SEQ ID NO: 1 as an active ingredient.

Another aspect of the present invention provides a method for the prevention or treatment of hyperhidrosis comprising administering a pentapeptide consisting of the amino acid sequence of SEG ID NO: 1 to a subject.

Further another aspect of the present invention provides a pentapeptide consisting of the amino acid sequence of SEQ ID NO: 1 for the use in the prevention or treatment of hyperhidrosis.

Further another aspect of the present invention provides a composition for the prevention or relief of hyperhidrosis, or the suppression of body odor comprising a pentapeptide consisting of the amino acid sequence of SEQ ID NO: 1 as an active ingredient.

Further another aspect of the present invention provides a method for the suppression of body odor comprising administering a pentapeptide consisting of the amino acid sequence of SEQ ID NO: 1 to a subject.

Further another aspect of the present invention provides a pentapeptide consisting of the amino acid sequence of SEQ ID NO: 1 for the use in the suppression of body odor.

Further another aspect of the present invention provides a composition for the pain relief comprising a pentapeptide consisting of the amino acid sequence of SEQ ID NO: 1 as an active ingredient.

Further another aspect of the present invention provides a pharmaceutical composition for the prevention or treatment of pain comprising a pentapeptide consisting of the amino acid sequence of SEQ ID NO: 1 as an active ingredient.

Further another aspect of the present invention provides a method for the prevention or treatment of pain comprising administering a pentapeptide consisting of the amino acid sequence of SEQ ID NO: 1 to a subject.

Further another aspect of the present invention provides a pentapeptide consisting of the amino acid sequence of SEQ ID NO: 1 for the use in the prevention or treatment of pain.

Further another aspect of the present invention provides a quasi-drug composition for the prevention or improvement of pain comprising a pentapeptide consisting of the amino acid sequence of SEQ ID NO: 1 as an active ingredient.

Further another aspect of the present invention provides a cosmetic composition for the pain relief comprising a pentapeptide consisting of the amino acid sequence of SEQ ID NO: 1 as an active ingredient.

Advantageous Effects

The pentapeptide consisting of the amino acid sequence of SEQ ID NO: 1 of the present invention is absorbed to the muscle layer of skin tissue through the skin, inhibits abnormal release of neurotransmitters from nerve terminals, and can reduce sweating. Therefore, it can be used to prevent, alleviate, improve, or treat the symptoms of hyperhidrosis by applying alone.

Further, the pentapeptide of the present invention can block the cause of body odor in advance and provide a semi-permanent body odor suppression effect by suppressing excessive sweat production.

The pentapeptide consisting of the amino acid sequence of SEQ ID NO: 1 of the present invention can inhibit the generation and transmission of pain by inhibiting the expression of pro-inflammatory cytokines in muscle cells and the release of pain transmission factors in nerve terminals, so it can be used to alleviate, improve, prevent or treat pain.

Further, since the pentapeptide of the present invention is absorbed through the skin to the muscle layer of the skin tissue, it can be used as a raw material for pharmaceuticals, quasi-drugs and cosmetics applied to the skin.

However, the effects of the present invention age not limited to the above-mentioned effects, and other effects not mentioned will be clearly understood by those skilled in the art from the following description.

DESCRIPTION OF DRAWINGS

FIG. 1a shows the results of confirming the high-temperature stability of the peptide during long-term storage at 45° C., and FIG. 1b shows the results of confirming the high-temperature stability of the peptide at the maximum heating temperature (121° C.).

FIG. 2a shows the result of confirming the formation of the SNARE complex by Western-blot, and FIG. 2b shows the result of confirming the degree of degradation of syntaxin 1a constituting the SNARE complex.

FIG. 10a shows the result of confirming the mRNA expression levels of IL-1α, TNF-α, IL-1β, and COX-2 genes by performing RT-PCR, and FIG. 10b shows the results of confirming the expression levels of COX-2, IL-1β, and TNF-α proteins through Western blotting.

FIG. 12a is the result of calculating the average value of pain intensity by the measurement of the Numeric rating scale (NRS), and FIG. 12b shows the degree of pain relief by the treatment of the KFLIK peptide(SEQ ID NO: 1).

BEST MODE

Figure 1A:
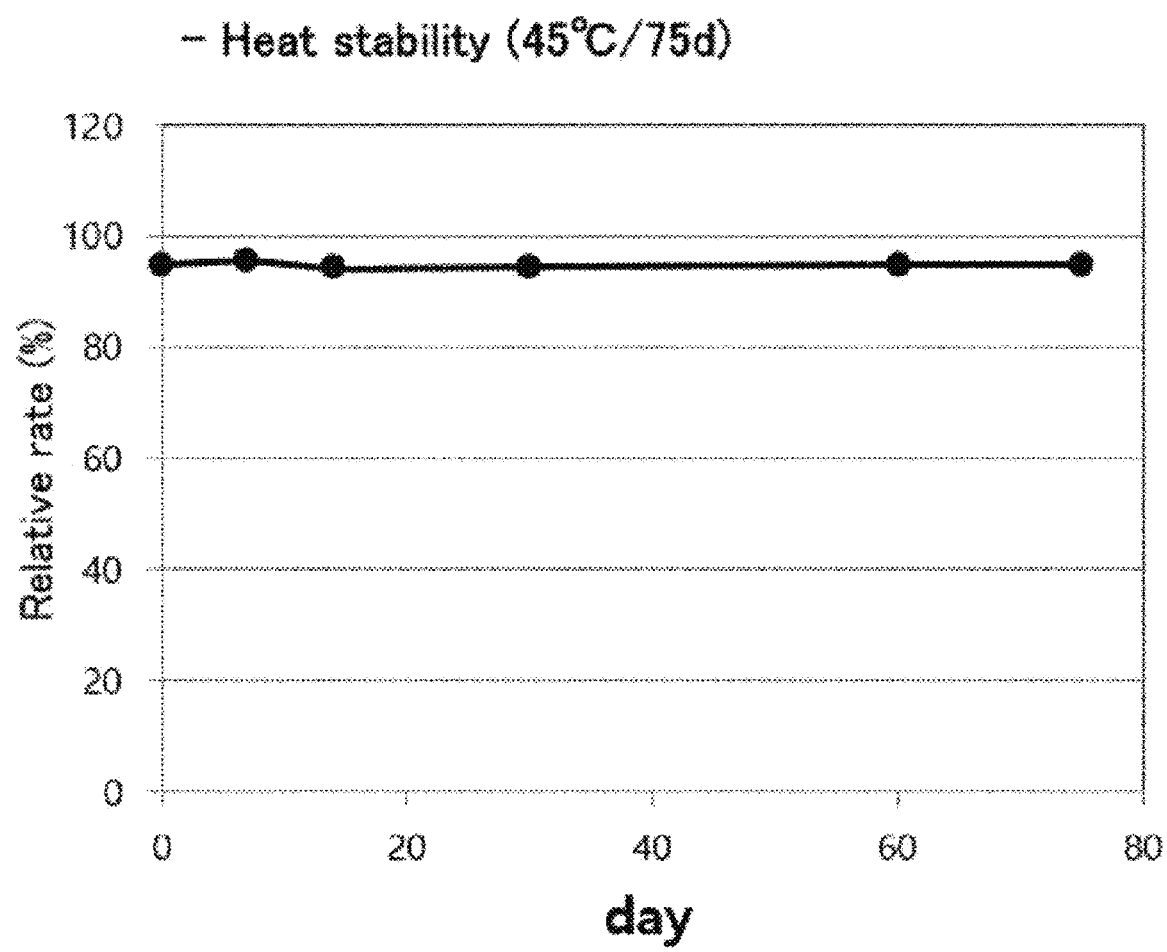
FIG. 1a and FIG. 1b show the results of the thermal stability evaluation of the KFLIK peptide (SEO ID NO: 1)

Hereinafter, the present invention will be described in detail.

One aspect of the present invention is to provide a pharmaceutical composition for the prevention or treatment of hyperhidrosis comprising a pentapeptide consisting of the amino acid sequence of SEQ. ID NO: 1 as an active ingredient.

Herein, the term 'peptide' refers to a linear or cyclic molecule formed by combining amino acid residues with each other by peptide bonds. The preparation of the peptide can be accomplished by conventional biological or chemical synthesis methods known in the art, and for example, it can be accomplished by methods such as solid-phase synthesis techniques.

Herein, the term 'pentapeptide' refers to a linear molecule consisting of five amino acid residues, and the pentapeptide of the present invention refers to a linear peptide molecule composed of the amino acid sequence of SEQ ID NO: 1 (KFLIK).

The 'peptide' and 'pentapeptide' may be variants or fragments of amino acids having different sequences by deletion, insertion, substitution or a combination thereof of amino acid residues within the range that does not affect the function. Amino acid exchanges that do not entirely alter the activity of the peptide are known in the art. In some cases, it may be modified by phosphorylation, sulfation, acrylation, glycosylation, methylation, farnesylation, etc. Accordingly, the present invention includes peptides having substantially the same amino acid sequence as the pentapeptide composed of the amino acid sequence of KFLIK(SEQ ID NO: 1), and variants or active fragments thereof. The substantially identical protein refers to an amino acid sequence having at least 75%, preferably at least 80%, for example, at least 85%, at least 90%, at least 95%, at least 98%, or at least 99% sequence homology with the amino acid sequence of KFLIK (SEQ ID NO: 1), but is not limited thereto, and it is included in the scope of the present invention if it has 75% or more amino acid sequence homology and has the same activity. In addition, the peptide of the present invention may further include a targeting sequence, a tag, a labeled residue, an amino acid sequence prepared for a specific purpose to increase the half-life or stability of the peptide.

In addition, in order to obtain better chemical stability, enhanced pharmacological properties (half-life, absorption, potency, efficacy, etc.), altered specificity (e.g., broad spectrum of biological activity), and reduced antigenicity, a protecting group may be bound to the N-terminus or C-terminus of the peptide of the present invention. For example, the protecting group may be acetyl group, fluorenyl methoxycarbonyl group, formyl group, palmitoyl group, myristyl group, stearyl group or polyethylene glycol (PEG), but if it is a component capable of modifying the peptide, particularly improving the stability of the peptide, it may be included without limitation. The 'stability' is used to include not only stability in vivo, which protects the peptide of the present invention from attack by proteolytic enzymes in vivo, but also storage stability (e.g., storage stability at room temperature).

The pentapeptide of the present invention consisting of the amino acid sequence of KFLIK(SEQ ID NO: 1) can prevent or treat hyperhidrosis by inhibiting the formation of the SNARE complex and inhibiting excessive release of neurotransmitters from nerve terminals.

Further, the pentapeptide of the present invention consisting of the amino acid sequence of KFLIK(SEQ ID NO: 1) can prevent or alleviate hyperhidrosis by suppressing the generation of sweat in the skin area where hyperhidrosis appears.

Further, since the pentapeptide of the present invention consisting of the amino acid sequence of KFLIK(SEQ ID NO: 1) penetrates into the muscle layer of skin tissue through transdermal absorption, it can improve or alleviate the symptoms of hyperhidrosis just by applying it to the lesion.

Herein, the 'hyperhidrosis' refers to a disease state characterized by excessive and uncontrolled sweating that exceeds the level necessary for cooling the body, and refers to a disease or symptom in which excessive sweat is secreted due to hyperfunction of the sweat gland and disturbance of its cholinergic stimulation. Herein, the hyperhidrosis includes both focal hyperhidrosis (primary hyperhidrosis) and generalized hyperhidrosis (secondary hyperhidrosis), and may occur in any one skin area selected from the group consisting of, for example, the face, forehead, neck, hands, feet, and armpits, but is not limited thereto.

In a specific embodiment, when the composition containing the pentapeptide of the present invention was applied to one palm, sole and armpit of a patient with hyperhidrosis, it was confirmed that the sweat production was reduced by 45% to 90% compared to the control area in the opposite site to which the composition was not applied.

Herein, the term 'prevention' refers to any action to suppress or delay pain by administering a composition containing the pentapeptide.

Herein, the term 'treatment' refers to any action in which pain is "relieved" or "improved" or beneficially changed by the administration of a composition containing the pentapeptide.

The pharmaceutical composition for the prevention or treatment of hyperhidrosis according to the present invention can be formulated and used according to conventional methods in the form of oral formulations such as powders, granules, tablets, capsules, suspensions, emulsions, syrups and aerosols, external preparations, suppositories, and sterile injection solutions. For formulation, suitable carriers, excipients or diluents commonly used in the preparation of pharmaceutical compositions may be included.

The pharmaceutically acceptable carrier may include lactose, dextrose, sucrose, sorbitol, mannitol, starch, acacia, gum, calcium phosphate, alginate, gelatin, calcium silicate, microcrystalline cellulose, polyvinyl pyrrolidone, cellulose, water, syrup, methyl cellulose, methyl hydroxybenzoate, propyl hydroxybenzoate, talc, magnesium stearate, mineral oil and the like, commonly used in formulation.

The pharmaceutical composition may further include a lubricant, a wetting agent, a sweetening agent, a flavoring agent, an emulsifying agent, a suspending agent, a preservative, and the like, in addition to the above.

The pharmaceutical composition may be administered orally or parenterally (e.g., intramuscularly, intravenously, intraperitoneally, subcutaneously, intradermally, or topically) according to a desired method. The dosage varies depending on the condition and weight of the patient, the severity of the disease, the drug form, the route and time of administration, but may be appropriately selected by those skilled in the art.

The pharmaceutical composition of the present invention is administered in a pharmaceutically effective amount. In the present invention, a 'pharmaceutically effective amount' means an amount sufficient to treat a disease with a reasonable benefit/risk ratio applicable to medical treatment, and the effective dose level may bd determined according to factors including the type and severity of the disease, drug activity, drug sensitivity, administration time, administration route and excretion rate, duration of treatment, and concurrent drugs and other well-known elements in the medical field. The pharmaceutical composition may be administered as an individual therapeutic agent or may be administered in combination with other antiobestic drugs, may be administered simultaneously with, separately, or sequentially from a conventional therapeutic agent, and may be administered singly or multiple times. It is important to administer an amount that can obtain the maximum effect with a minimum amount without side effects, taking all of the above factors into consideration, and it can be easily determined by those skilled in the art.

The effective amount of the pharmaceutical composition may vary depending on the patient's age, sex, condition, body weight, absorption of the active ingredient into the body, inactivation rate, excretion rate, disease type, drug used in combination, and it can be increased or decreased depending on the route of administration, the severity of obesity, sex, weight, age, etc. For example, the pharmaceutical composition may be administered at about 0.0001 µg to 500 mg, preferably 0.0.1 µg to 100 mg per 1 kg of the patient's body weight per day.

In another aspect, the present invention provides a composition for preventing or alleviating hyperhidrosis or suppressing body odor, comprising a pentapeptide consisting of the amino acid sequence of KFLIK(SEQ ID NO: 1) as an active ingredient.

The pentapeptide of the present invention consisting of the amino acid sequence of KFLIK(SEQ ID NO: 1) can prevent or treat hyperhidrosis by inhibiting the formation of the SNARE complex and inhibiting the excessive release of neurotransmitters from nerve terminals, and can suppress body odor caused by excessive sweat production.

In addition, the pentapeptide of the present invention consisting of the amino acid sequence of KFLIK(SEQ ID NO: 1) can prevent or alleviate hyperhidrosis by showing the effect of suppressing the sweat production in the skin area where hyperhidrosis appears.

Further, the pentapeptide of the present invention consisting of the amino acid sequence of KFLIK(SEQ ID NO: 1) can inhibit the growth of body odor-causing strains, thereby suppressing the generation of body odor caused by the degradation of substances contained in sweat.

The specific details of the peptide, pentapeptide and hyperhidrosis are as described above.

Herein, the 'body odor' refers to the odor of degradation products generated when sweat gland secretions, that is, fat, protein, sebum, and/or waste products secreted with sweat are degraded by bacteria, and specifically, it may be an odor generated in body parts where a lot of sweat is generated, such as armpits, feet, hands, forehead, neck, face, or scalp.

Herein, the 'suppression of body odor' refers to preventing odors caused by degradation products of sweat gland secretions by microorganisms or to suppressing sweat production, which is the cause of body odor. Specifically, the body odor suppression may be to prevent odor from the armpits, feet, hands, forehead, neck, face, or scalp, or to suppress sweat production in the area, and more specifically, to prevent osmidrosis.

In further another aspect, the present invention provides a cosmetic composition for the prevention or relief of hyperhidrosis, or the suppression of body odor comprising the pentapeptide consisting of the amino acid sequence of KFLIK(SEQ ID NO: 1) as an active ingredient.

The cosmetic composition may be prepared in any formulation conventionally prepared in the art, and for example, it may be formulated in the form of solution, suspension, emulsion, paste, gel, cream, lotion, powder, soap, surfactant-containing cleansing, oil, powder foundation, emulsion foundation, wax foundation and spray, etc., but is not limited thereto.

The cosmetic composition may be prepared in various forms such as solution, sol gel, emulsion, oil, wax, aerosol, etc., for example, soft lotion, nourishing lotion, nourishing cream, massage cream, essence, eye cream, cleansing cream, cleansing foam, cleansing water, pack, spray, powder, deodorant, hair tonic, hair cream, hair lotion, hair shampoo, hair rinse, hair conditioner, Hairspray, hair aerosol, pomade, gel and the like, but is not limited thereto.

The cosmetic composition of the present invention may include other additives such as excipients and carriers in addition to the pentapeptide composed of the amino acid sequence of KFLIK(SEQ ID NO: 1), and it is possible to apply and blend the usual ingredients that are combined to general cosmetics as needed.

When the formulation the cosmetic composition is paste, cream or gel, animal oil, vegetable oil, wax, paraffin, starch, tragacanth, cellulose derivative, polyethylene glycol, silicone, bentonite, silica, talc or zinc oxide, etc. may be used as a carrier ingredient.

When the formulation of the cosmetic composition is powder or spray, lactose, talc, silica, aluminum hydroxide, calcium silicate or polyamide powder may be used as a carrier ingredient. In particular, when the formulation is spray, a propellant such as chlorofluorohydrocarbon, propane/butane or dimethyl ether may be additionally included, but is not limited thereto.

When the formulation of the cosmetic composition is solution or emulsion, a solvent, solubilizer or emulsifier may be used as a carrier component, for example, water, ethanol, isopropanol, ethyl carbonate, ethyl acetate, benzyl alcohol, benzyl benzoate, propylene glycol, 1,3-butyl glycol oil, glycerol aliphatic ester, polyethylene glycol or fatty acid ester of sorbitan may be used.

When the formulation of the cosmetic composition is suspension, a liquid diluent such as water, ethanol or propylene glycol, a suspending agent such as ethoxylated isostearyl alcohol, polyoxyethyl sorbitol ester and polyoxyethylene sorbitan ester, microcrystalline cellulose, aluminum metahydroxide, bentonite, agar or tragacanth and the like may be used as a carrier ingredient.

When the formulation of the cosmetic composition is surfactant-containing cleansing, aliphatic alcohol sulfate, aliphatic alcohol ether sulfate, sulfosuccinic acid monoester, isethionate, imidazolinium derivatives, methyl taurate, sarcosinate, fatty acid amide, ether sulfate, alkylamidobetaine, fatty alcohol, fatty acid glyceride, fatty acid diethanolamide, vegetable oil, lanolin derivatives or ethoxylated glycerol fatty acid ester and the like can be used as a carrier ingredient.

When the formulation of the cosmetic composition is hair shampoo, the base ingredients for the composition of the shampoo, such as thickeners, surfactants, viscosity modifiers, moisturizers, pH adjusters, preservatives, essential oils, etc., may be mixed with the Trolox-peptide conjugate of the present invention. CDE may be used as the thickener, and LES, an anionic surfactant, and coco betaine, an amphoteric surfactant, may be used as the surfactant, Poly Quarter may be used as the viscosity modifier, glycerin may be used as the moisturizer, and citric acid and sodium hydroxide may be used as the pH adjuster. Grapefruit extract and the like may be used as the preservative, and in addition, essential oils such as cedarwood, peppermint, and rosemary, silk amino acids, pentaol, or vitamin E may be added.

The ingredients included in the cosmetic composition may further include ingredients commonly used in cosmetic compositions, for example, conventional adjuvants, such as antioxidants, stabilizers, solubilizers, vitamins, pigments and fragrances, etc., in addition to the Trolox-peptide conjugate and carrier ingredients of the present invention as an active ingredient, but is not limited thereto.

In further another aspect, the present invention provides a method for the prevention or treatment of hyperhidrosis comprising administering the pentapeptide consisting of the amino acid sequence of SEQ ID NO: 1 to a subject.

In further another aspect, the present invention provides a pentapeptide consisting of the amino acid sequence of SEQ ID NO: 1 for the use in the prevention or treatment of hyperhidrosis.

In further another aspect, the present invention provides a method for the suppression of body odor comprising administering the pentapeptide consisting of the amino acid sequence of SEQ ID NO: 1 to a subject.

In further another aspect, the present invention provides a pentapeptide consisting of the amino acid sequence of SEQ ID NO: 1 for the use in suppressing body odor.

The 'subject' may include a human. In addition, the term 'subject' may be a subject in need of administration of the pentapeptide of the present invention, and the subject in need of administration may include individuals who have been diagnosed with hyperhidrosis or dysodia, individual's who have developed hyperhidrosis or dysodia-related symptoms, as well as individuals who wish to administer for the prevention of the development of the disease or symptoms or health improvement.

The 'administration' means providing a predetermined substance to a patient by any suitable method, and the administration route of the pentapeptide of the present invention can be administered orally or parenterally through any general route as long as it can reach the target tissue. In addition, the pentapeptide may be administered by any device capable of transporting the active agent to a target cell.

As described above, the pentapeptide of the present invention inhibits the excessive release of neurotransmitters by inhibiting the formation of SNARE complexes in nerve cells, and has an excellent effect of suppressing sweat production by penetrating into the nerve cells of the muscle layer just by applying it to the area where sweat is excessively produced. Therefore, it can be used as a raw material for a pharmaceutical or cosmetic composition for the purpose of preventing, improving, alleviating or treating hyperhidrosis or suppressing body.

Further another aspect of the present invention provides a composition for pain relief comprising the pentapeptide consisting of the amino acid sequence of SEQ ID NO: 1 as an active ingredient.

Herein, the term 'peptide' refers to a linear or cyclic molecule formed by combining amino acid residues with each other by peptide bonds. The preparation of the peptide can be accomplished by conventional biological or chemical synthesis methods known in the art, and for example, it can be accomplished by methods such as solid-phase synthesis techniques.

Herein, the term 'pentapeptide' refers to a linear molecule consisting of five amino acid residues, and the pentapeptide of the present invention refers to a linear peptide molecule composed of the amino acid sequence of SEQ ID NO: 1 (KFLIK).

The 'peptide' and 'pentapeptide' may be variants or fragments of amino acids having different sequences by deletion, insertion, substitution or a combination thereof of amino acid residues within the range that does not affect the function. Amino acid exchanges that do not entirely alter the activity of the peptide are known in the art. In some cases, it may be modified by phosphorylation, sulfation, acrylation, glycosylation, methylation, farnesylation, etc. Accordingly, the present invention includes peptides having substantially the same amino acid sequence as the pentapeptide composed of the amino acid sequence of KFLIK(SEQ ID NO: 1), and variants or active fragments thereof. The substantially identical protein refers to an amino acid sequence having at least 75%, preferably at least 80%, for example, at least 85%, at least 90%, at least 95%, at least 98%, or at least 99% sequence homology with the amino acid sequence of KFLIK (SEQ ID NO: 1), but is not limited thereto, and it is included in the scope of the present invention if it has 75% or more amino acid sequence homology and has the same activity. In addition, the peptide of the present invention may further include a targeting sequence, a tag, a labeled residue, an amino acid sequence prepared for a specific purpose to increase the half-life or stability of the peptide.

In addition, in order to obtain better chemical stability, enhanced pharmacological properties. (half-life, absorption, potency, efficacy, etc.), altered specificity (e.g., broad spectrum of biological activity), and reduced antigenicity, a protecting group may be bound to the N-terminus or C-terminus of the peptide of the present invention. For example, the protecting group may be acetyl group, fluorenyl methoxycarbonyl group, formyl group, palmitoyl group, myristyl group, stearyl group or polyethylene glycol (PEG), but if it is a component capable of modifying the peptide, particularly improving the stability of the peptide, it may be included without limitation. The 'stability' is used to include not only stability in vivo, which protects the peptide of the present invention from attack by proteolytic enzymes in vivo, but also storage stability (e.g., storage stability at room temperature).

The pentapeptide of the present invention consisting of the amino acid sequence of KFLIK(SEQ ID NO: 1) suppresses the expression of pro-inflammatory cytokines in myocytes and suppresses the inflammatory response, so it can prevent or treat pain caused by micro laceration.

Further, the pentapeptide of the present invention consisting of the amino acid sequence of KFLIK(SEQ ID NO: 1) can prevent or treat pain by inhibiting the release of substance P, a pain transmitter, secreted from synaptic neurons, to prevent transmission of pain.

Further, the pentapeptide of the present invention consisting of the amino acid sequence of KFLIK(SEQ ID NO: 1) penetrates into the muscle layer of skin tissue through transdermal absorption, so it can prevent, alleviate or treat pain just by applying it to the lesion.

Herein, the 'pain' refers to an unpleasant sensation caused by stimulation of a specific nerve having a pain receptor, and includes all symptoms for which the sensation is alleviated, prevented, or treated by the pentapeptide of the present invention. The pain according to the present invention may be acute or chronic pain.

Herein, pain may be at least one selected from the group consisting of inflammatory pain, neuropathic pain, nociceptive pain, and psychogenic pain, and for example, it may be at least one selected from the group consisting of cancer pain and postoperative pain in which nociceptive pain, inflammatory pain and the like work in combination; trigeminal neuralgia pain, idiopathic pain and diabetic neuropathic pain belonging to neuropathic pain; and migraine and menstrual pain belonging to visceral pain, but is not limited thereto.

Further, the composition comprising the pentapeptide of the present invention can be applied to pain occurring in the skin or musculoskeletal system. For example, it may be the pain accompanying at least one selected from diabetic neuropathy, diabetic peripheral neuropathy, pain caused by viral infection, nociceptive pain, facial neuralgia, postherpetic neuralgia, back pain, disc, radiculopathy, neuropathy, hyperalgesia, central sensitization-related pain, allodynia, cancer pain, myofascial pain syndrome, carpal tunnel syndrome, cubital tunnel syndrome (ulnar neuropathy), de Quervain syndrome, rotator cuff syndrome, osteoarthritis, tendonitis, tendon synovitis, lateral epicondylitis, medial epicondylitis, tendon injury, bursitis, ligament inflammation, tennis elbow, golf elbow, knee joint pain, Patellar tendonitis, meniscus injury, finger joint pain, tendonitis of the wrist, wrist sprain, ankle sprain, sprain, fibromyalgia, plantar fasciitis, inflammatory arthritis, infectious arthritis, rheumatoid arthritis, degenerative joint pain, frozen shoulder, gout, postpartum joint pain, osteomyelitis, ankylosing spondylitis, degenerative spinal disorders, lumbar stenosis, cruralgia, sprains, contusions, joint pain and sciatica.

Specifically, the pentapeptide according to the present invention reaches the muscle layer just by applying it to the skin, and is absorbed through the skin thereby showing an excellent analgesic effect. In particular, it can effectively act on pain in the skin or tissue located close to the skin, especially around the area where subcutaneous fat is thin. For example, it can effectively prevent or treat pain accompanying sprains in areas such as knees, elbows, fingers, shoulders, ankles, feet and the like, bruises, joint pain, tendonitis, ligament inflammation, frozen shoulder, rotator cuff disease, tennis elbow, golf elbow and de Quervain syndrome.

Further another aspect of the present invention provides a pharmaceutical composition for the prevention or treatment of pain comprising the pentapeptide consisting of the amino acid sequence of SEQ ID NO: 1 as an active ingredient.

Herein, the term 'prevention' refers to any action to suppress or delay pain by administering a composition containing the pentapeptide.

Herein, the term 'treatment' refers to any action in which pain is "relieved" or "improved" or beneficially changed by the administration of a composition containing the pentapeptide.

The pharmaceutical composition for the prevention or treatment of pain according to the present invention can be formulated and used according to conventional methods in the form of oral formulations such as powders, granules, tablets, capsules, suspensions, emulsions, syrups and aerosols, external preparations, suppositories, and sterile injection solutions. For formulation, suitable carriers, excipients or diluents commonly used in the preparation of pharmaceutical compositions may be included.

The pharmaceutically acceptable carrier may include lactose, dextrose, sucrose, sorbitol, mannitol, starch, acacia, gum, calcium phosphate, alginate, gelatin, calcium silicate, microcrystalline cellulose, polyvinyl pyrrolidone, cellulose, water, syrup, methyl cellulose, methyl hydroxybenzoate, propyl hydroxybenzoate, talc, magnesium stearate, mineral oil and the like, commonly used in formulation.

The pharmaceutical composition may further include a lubricant, a wetting agent, a sweetening agent, a flavoring agent, an emulsifying agent, a suspending agent, a preservative, and the like, in addition to the above.

The pharmaceutical composition may be administered orally or parenterally (e.g., intramuscularly, intravenously, intraperitoneally, subcutaneously, intradermally, or topically) according to a desired method. The dosage varies depending on the condition and weight of the patient, the severity of the disease, the drug form, the route and time of administration, but may be appropriately selected by those skilled in the art.

The pharmaceutical composition of the present invention is administered in a pharmaceutically effective amount. In the present invention, a 'pharmaceutically effective amount' means an amount sufficient to treat a disease with a reasonable benefit/risk ratio applicable to medical treatment, and the effective dose level may be determined according to factors including the type and severity of the disease, drug activity, drug sensitivity, administration time, administration route and excretion rate, duration of treatment, and concurrent drugs and other well-known elements in the medical field. The pharmaceutical composition may be administered as an individual therapeutic agent or may be administered in combination with other pain reliever, may be administered simultaneously with, separately, or sequentially from a conventional therapeutic agent, and may be administered singly or multiple times. It is important to administer an amount that can obtain the maximum effect with a minimum amount without side effects, taking all of the above factors into consideration, and it can be easily determined by those skilled in the art.

The effective amount of the pharmaceutical composition may vary depending on the patient's age, sex, condition, body weight, absorption of the active ingredient into the body, inactivation rate, excretion rate, disease type, drug used in combination, and it can be increased or decreased depending on the route of administration, the severity of obesity, sex, weight, age, etc. For example, the pharmaceutical composition may be administered at about 0.0001 µg to 500 mg, preferably 0.01 µg to 100 mg per 1 kg of the patient's body weight per day.

Further another aspect of the present invention provides a quasi-drug composition for the prevention or improvement of pain comprising the pentapeptide consisting of the amino acid sequence of SEQ ID NO: 1 as an active ingredient.

The specific details of the peptide, pentapeptide and pain are as described above.

Herein, the term 'quasi-drug' refers to items that have a milder effect than pharmaceuticals among items used for the purpose of diagnosing, treating, improving, alleviating, caring or preventing human or animal diseases. For example, according to the Pharmaceutical Affairs Act, quasi-drug is products excluding items used for pharmaceutical purposes, and includes products used to treat or prevent human/animal diseases, products with minor or no direct action on the human body, etc.

The quasi-drug composition of the present invention may be prepared with at least one selected from the group consisting of body cleanser, foam, soap, mask, ointment, cream, lotion, essence and spray, but is not limited thereto. In addition, the composition may be manufactured in the form of a band, sanitary napkin, etc., but is not limited thereto.

When the pentapeptide of the present invention is used as a quasi-drug additive, the composition can be added as it is or used together with other quasi-drugs or quasi-drug ingredients, and can be appropriately used according to a conventional method.

In further another aspect, the present invention provided a cosmetic composition for pain relief comprising the pentapeptide consisting of the amino acid sequence of SEQ ID NO: 1 as an active ingredient.

The specific details of the peptide, pentapeptide and pain are as described above.

The cosmetic composition may be prepared in any formulation conventionally prepared in the art, and for example, it may be formulated in the form of solution, suspension, emulsion, paste, gel, cream, lotion, powder, soap, surfactant-containing cleansing, oil, powder foundation, emulsion foundation, wax foundation and spray, etc., but is not limited thereto.

The cosmetic composition may be prepared in various forms such as solution, sol gel, emulsion, oil, wax, aerosol, etc., for example, soft lotion, nourishing lotion, nourishing cream, massage cream, essence, eye cream, cleansing cream, cleansing foam, cleansing water, pack, spray, powder, hair tonic, hair cream, hair lotion, hair shampoo, hair rinse, hair conditioner, Hairspray, hair aerosol, pomade, gel and the like, but is not limited thereto.

The cosmetic composition of the present invention may include other additives such as excipients and carriers in addition to the pentapeptide composed of the amino acid sequence of KFLIK(SEQ ID NO: 1), and it is possible to apply and blend the usual ingredients that are combined to general cosmetics as needed.

When the formulation the cosmetic composition is paste, cream or gel, animal oil, vegetable oil, wax, paraffin, starch, tragacanth, cellulose derivative, polyethylene glycol, silicone, bentonite, silica, talc or zinc oxide, etc. may be used as a carrier ingredient.

When the formulation of the cosmetic composition is powder or spray, lactose, talc, silica, aluminum hydroxide, calcium silicate or polyamide powder may be used as a carrier ingredient. In particular, when the formulation is spray, a propellant such as chlorofluorohydrocarbon, propane/butane or dimethyl ether may be additionally included, but is not limited thereto.

When the formulation of the cosmetic composition is solution or emulsion, a solvent, solubilizer or emulsifier may be used as a carrier component, for example, water, ethanol, isopropanol, ethyl carbonate, ethyl acetate, benzyl alcohol, benzyl benzoate, propylene glycol, 1,3-butyl glycol oil, glycerol aliphatic ester, polyethylene glycol or fatty acid ester of sorbitan may be used.

When the formulation of the cosmetic composition is suspension, a liquid diluent such as water, ethanol or propylene glycol, a suspending agent such as ethoxylated isostearyl alcohol, polyoxyethyl sorbitol ester and polyoxyethylene sorbitan ester, microcrystalline cellulose, aluminum metahydroxide, bentonite, agar or tragacanth and the like may be used as a carrier ingredient.

When the formulation of the cosmetic composition is surfactant-containing cleansing, aliphatic alcohol sulfate, aliphatic alcohol ether sulfate, sulfosuccinic acid monoester, isethionate, imidazolinium derivatives, methyl taurate, sarcosinate, fatty acid amide ether sulfate, alkylamidobetaine, fatty alcohol, fatty acid glyceride, fatty acid diethanolamide, vegetable oil, lanolin derivatives or ethoxylated glycerol fatty acid ester and the like can be used as a carrier ingredient.

When the formulation of the cosmetic composition is hair shampoo, the base ingredients for the composition of the shampoo, such as thickeners, surfactants, viscosity modifiers, moisturizers, pH adjusters, preservatives, essential oils, etc., may be mixed with, the pentapeptide conjugate of the present invention. CDE may be used as the thickener, and LES, an anionic surfactant, and coco betaine, an amphoteric surfactant, may be used as the surfactant, Poly Quarter may be used as the viscosity modifier, glycerin may be used as the moisturizer, and citric acid and sodium hydroxide may be used as the pH adjuster. Grapefruit extract and the like may be used as the preservative, and in addition, essential oils such as cedarwood, peppermint, and rosemary, silk amino acids, pentaol, or vitamin E may be added.

The ingredients included in the cosmetic composition may further include ingredients commonly used in cosmetic compositions, for example, conventional adjuvants such as antioxidants, stabilizers, solubilizers, vitamins, pigments and fragrances, etc., in addition to the pentapeptide conjugate and carrier ingredients of the present invention as an active ingredient, but is not limited thereto.

In further another aspect, the present invention provides a method for the prevention or treatment of pain comprising administering the pentapeptide consisting of the amino acid sequence of SEQ ID NO: 1 to a subject.

In further another aspect, the present invention provides a pentapeptide consisting of the amino acid sequence of SEQ ID NO: 1 for the prevention or treatment of pain.

In further another aspect, the present invention provides a quasi-drug composition for the prevention or improvement of pain comprising the pentapeptide consisting of the amino acid sequence of SEQ ID NO: 1 as an active ingredient.

In further another aspect, the present invention provides a cosmetic composition for pain relief comprising the pentapeptide consisting of the amino acid sequence of SEQ ID NO: 1 as an active ingredient.

The 'subject' may include a human. In addition, the term 'subject' may be a subject in need of administration of the pentapeptide of the present invention, and the subject in need of administration may include individuals who have been diagnosed with pain, individuals who have developed pain, as well as individuals who wish to administer for the prevention of the development of the disease or symptoms or health improvement.

The 'administration' means providing a predetermined substance to a patient by any suitable method, and the administration route of the composition of the present invention can be administered orally or parenterally through any general route as long as it can reach the target tissue. In addition, the composition may be administered by any device capable of transporting the active agent to a target cell.

As described above, the pentapeptide of the present invention suppresses the pain caused by the inflammatory reaction by inhibiting the expression of pro-inflammatory cytokines in muscle cells, prevents the transmission of pain by inhibiting the release of substance P from nerve terminals, and is effective in suppressing pain by penetrating into the nerve cells of the muscle layer just by applying it to the skin. Therefore, it can be usefully used as a raw material for pharmaceuticals, quasi-drugs, or cosmetic compositions for the purpose of relieving, improving, preventing, or treating pain.

Hereinafter, the present invention will be, described in detail by way of Examples and Experimental Examples.

However, the following examples and experimental examples are only for illustrating the present invention, and the content of the present invention is not limited by the following examples and experimental examples.

Example 1

Synthesis and Confirmation of Physical Properties of Novel Pentapeptide 1-1. Synthesis of Pentapeptide A novel peptide sequence 'KFLIK' consisting of the amino acid sequence of SEQ ID NO: 1 was prepared using a known method. As a result of measuring the molecular weight of the peptide containing the amino acid sequence of SEQ ID NO: 1 using a molecular weight measuring instrument, it was confirmed that the molecular weight corresponds to 647.4 Da.

1-2. Evaluation of High Temperature Stability During Long-Term Storage

The peptide of the present invention consisting of the amino acid sequence of SEQ ID NO: 1 was dissolved in sterile distilled water at a concentration of 1000 ppm, stored at 45° C. for 7 days, 14 days, 28 days, 60 days and 75 days, followed by HPLC analysis.

As a result, as shown in FIG. 1*a*, it was confirmed that the peptide of the present invention maintained stability for 75 days, which is the maximum observation day at 45° C.

1-3. Evaluation of High Temperature Stability

The peptide of the present invention was dissolved in sterile distilled water at a concentration of 1000 ppm, heated at 121° C. for 15 minutes and 30 minutes, followed by HPLC analysis.

Figure 1B:
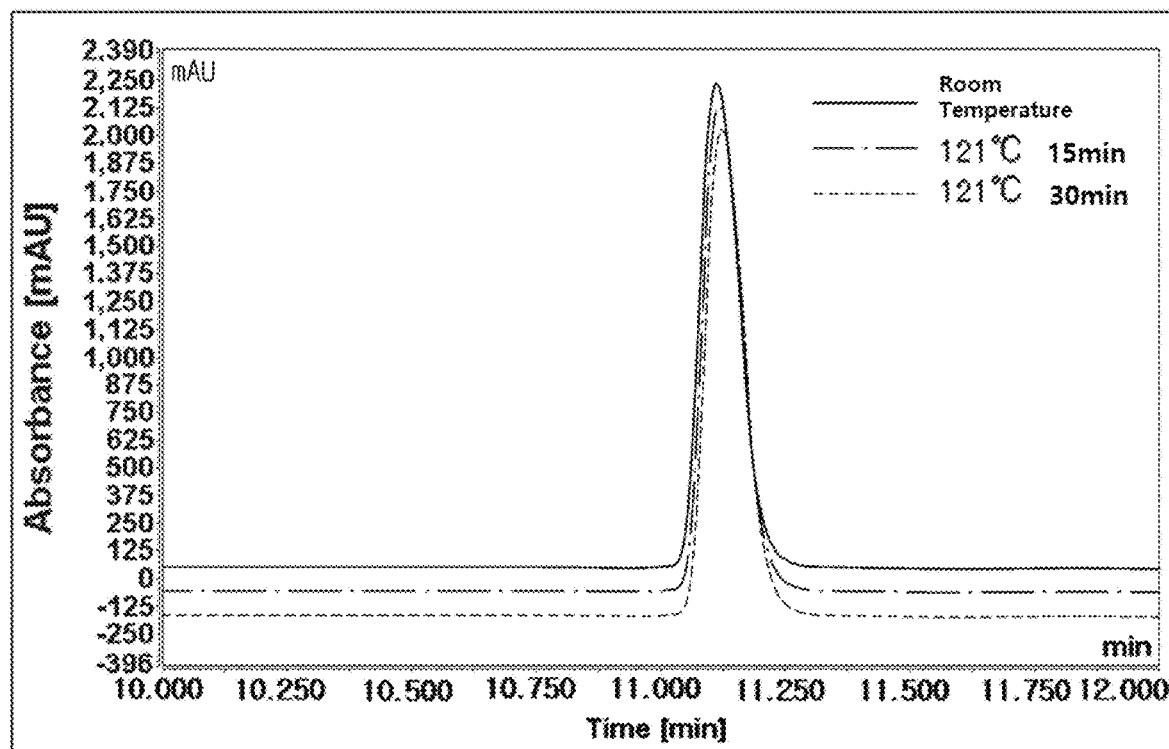

As a result, as shown in FIG. 1*b*, it was confirmed that the peptide of the present invention maintained stability for 30 minutes, which is the maximum heating time at 121° C.

Experimental Example 1

Confirmation of Inhibitory Effect on SNARE Complex Formation in Nerve Cells 1-1. Confirmation of Inhibitory Effect on SNARE Complex Formation In order to confirm the effect of inhibiting neurotransmitter release in nerve cells by the pentapeptide of the present invention, a neuroblastoma-derived cell line (SH-SY5Y) was used to determine whether or not SNARE complex formation was inhibited.

) Specifically, SH-SY5Y cells were seeded in a 6-well plate at a density of $3\times10^5$ cells/well and cultured in a 37° C., 5% $CO_2$ incubator for 24 hours, and then the medium was replaced with serum-free medium. Then, the pentapeptide was added to the 6-well plate at concentrations of 10 μM, 50 μM and 100 μM, and 0.2 μM Botulinum toxin type C light chain (BoNT/C LC) as a positive control group was added thereto and cultured. After 24 hours, cells were collected, lysates were obtained, and Western blotting for syntaxin 1a antibody (synaptic systems, Germany) was performed.

As a result, as shown in FIG. 2*a*, when treated with the pentapeptide of the present invention, SNARE complex formation was inhibited, similar to the positive control treated with botulinum toxin.

Through this, it can be seen that the pentapeptide of the present invention inhibits the formation of the SNARE complex and prevents synaptic vesicles from fusing with the presynaptic membrane, thereby inhibiting neurotransmitter release.

1-2. Confirmation of Degradation Effect on Syntaxin 1a Protein

In order to confirm the effect of the pentapeptide of the present invention on inhibiting neurotransmitter release in nerve cells, it was confirmed whether the pentapeptide of the present invention has the ability to degrade syntaxin 1a protein constituting t-SNARE.

Specifically, in the experimental group, 1 µg of recombinant syntaxin 1a protein (Novus biologicals, USA) and the pentapeptide of 20 µM, 100 µM, and 200 µM of the present invention were added to reaction buffer (50 mM HEPES, 40 mM 2-ME, 20 µM ZnCl2, pH 7.4), and in the negative control group, only recombinant syntaxin 1a protein was added. After reacting for 4 hours at 37° C., Western blotting was performed using syntaxin 1a antibody (synaptic systems, Germany).

Figure 2A:
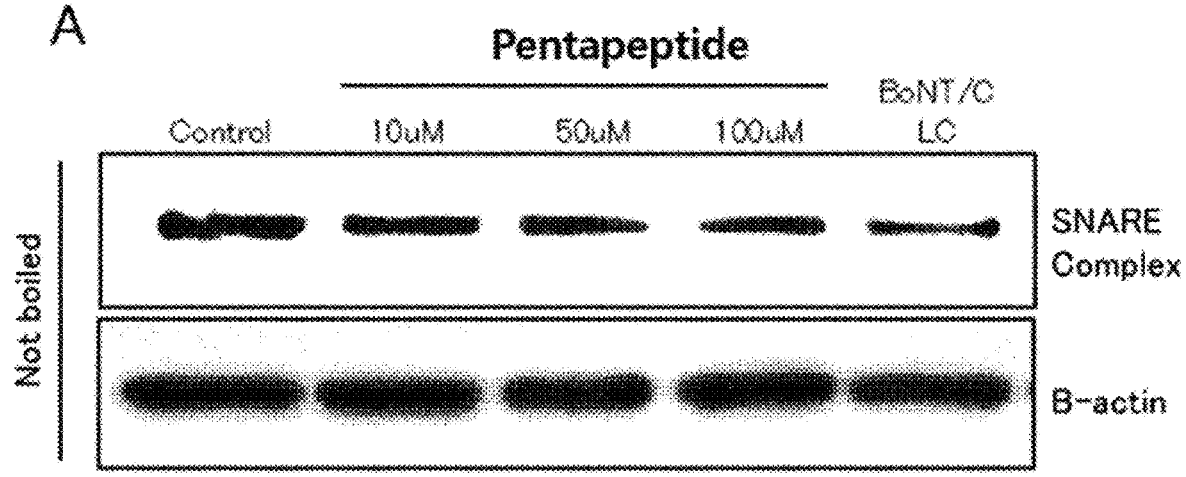
FIG. 2a and FIG. 2b show the effect of inhibiting the formation of SNARE complex by the KFLIK peptide(SEQ ID NO: 1) treatment in nerve cells.
Figure 2A:
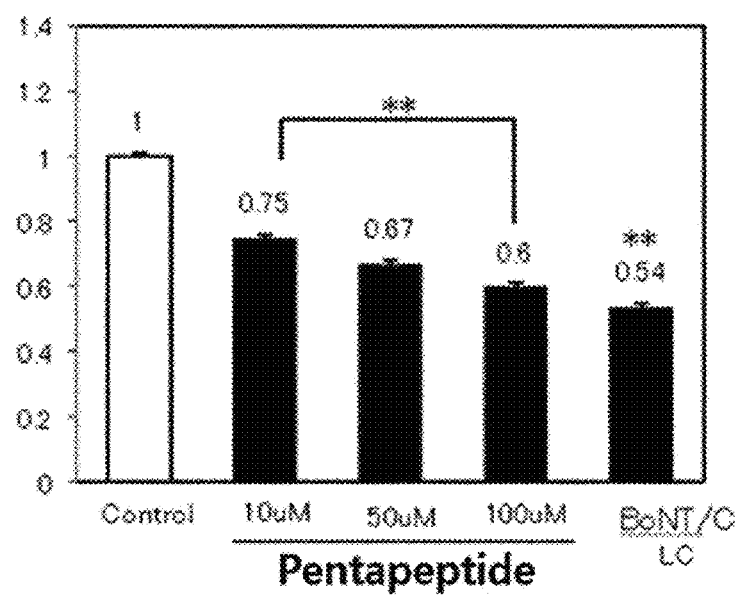
Figure 2B:
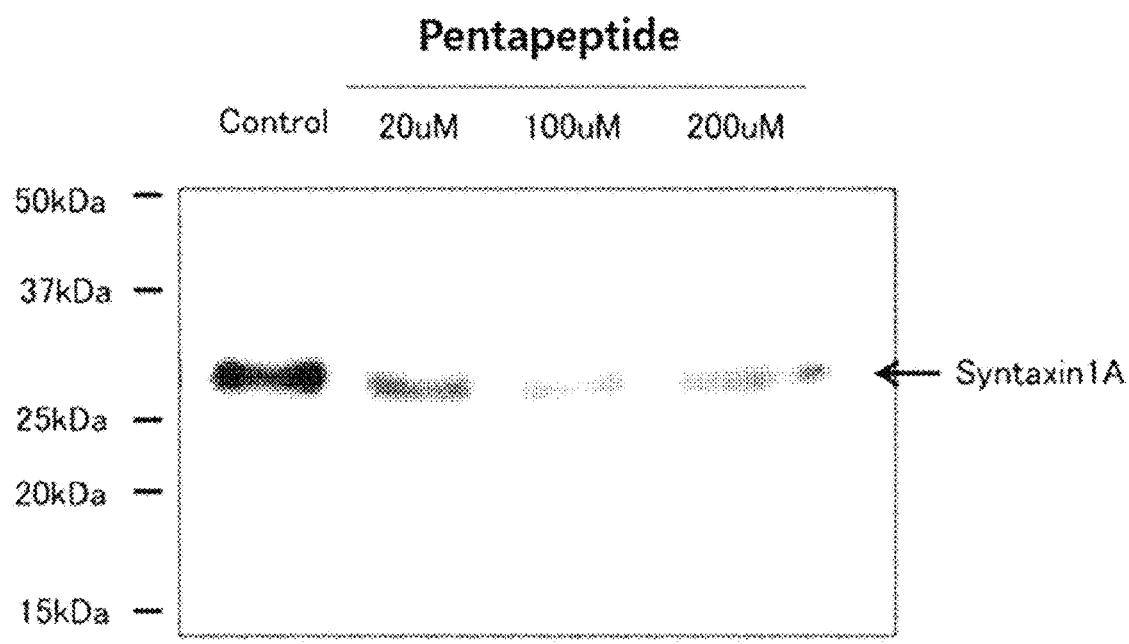

As a result, as shown in FIG. 2*b*, it was confirmed that the band of recombinant syntaxin 1a protein was reduced in a concentration-dependent manner when the pentapeptide of the present invention was treated.

Through this, it can be seen that the pentapeptide of the present invention has the effect of inhibiting the release of neurotransmitters by degrading the syntaxin 1a protein and preventing the formation of the SNARE complex.

Experimental Example 2

Confirmation of Inhibitory Effect on Neurotransmitter Release in Nerve Cells

In order to confirm the effect of inhibiting neurotransmitter release in nerve cells by the pentapeptide of the present invention, the secretion of acetylcholine, a neurotransmitter, was measured using a neuroblastoma-derived cell line (SH-SY5Y).

Specifically, SH-SY5Y cells were injected into a dish and cultured in a 37° C., 5% $CO_2$ incubator for 24 hours, then the medium was replaced with serum-free medium and cultured for 48 hours. Then, the pentapeptide was added to the dish at concentrations of 1 µM, 10 µM and 50 µM, and 50 nM of tetanus as a positive control group was added thereto and cultured. After a certain period of time, the release of acetylcholine was induced by treatment of nicotine (NIC) and potassium chloride (KCl). Then, the amount of acetylcholine secreted in the medium was measured using an acetylcholine assay kit.

Figure 3:
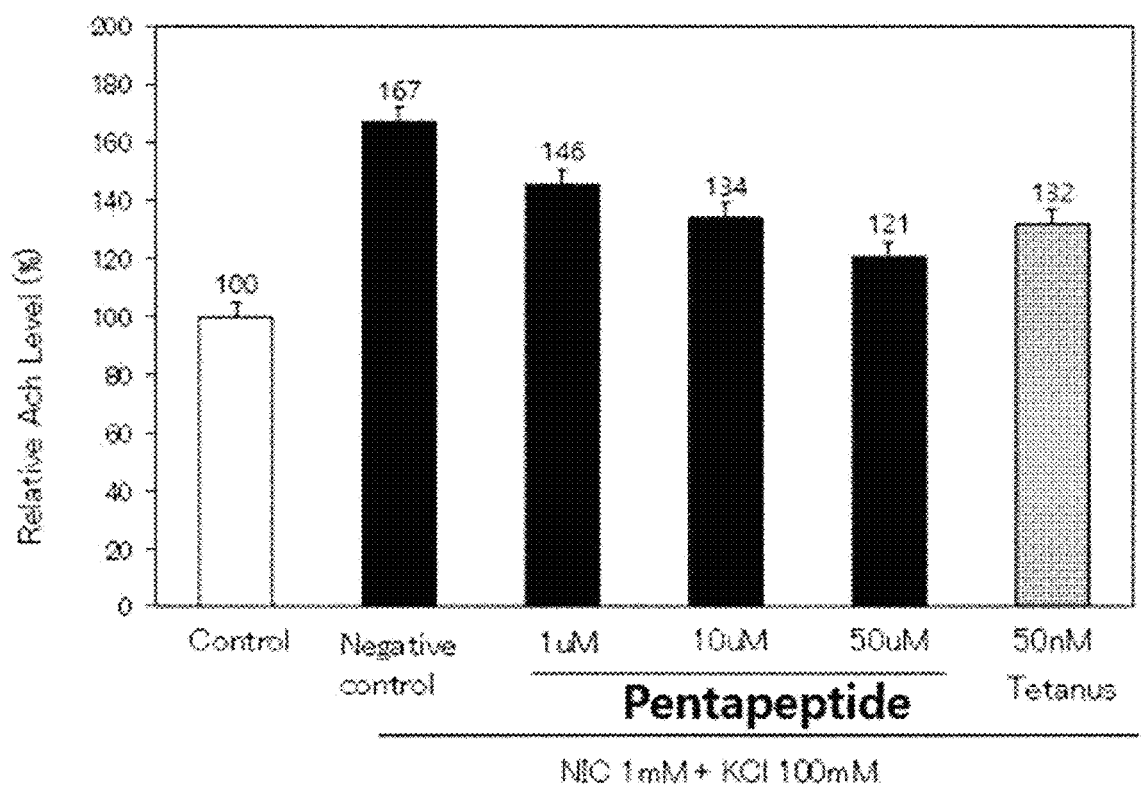
FIG. 3 shows the inhibitory effect of neurotransmitter release by the treatment of KFLIK peptide(SEQ ID NO: 1) in nerve cells.

As a result, as shown in FIG. 3, in the group treated with only nicotine (NIC) and potassium chloride (KCl), the amount of acetylcholine released increased compared to the control group that was not treated with anything, but in the group treated with the pentapeptide of the present invention, the release of acetylcholine was significantly suppressed.

Experimental Example 3

Confirmation of Inhibitory Effect of Pentapeptide on Hyperhidrosis Through Human Efficacy Evaluation In order to confirm that the pentapeptide according to the present invention actually has an effect on inhibiting sweat secretion in the palms, soles, and armpits, the degree of sweat secretion was taken as an image using starch and iodine, and intensity analysis was performed using Image J software.

Specifically, human efficacy evaluation was performed for the degree of sweat secretion in 10 subjects with local hyperhidrosis (palm, sole, armpit). A solution containing 2000 ppm of the pentapeptide of the present invention was applied to the one palm, sole, or armpit of the subject using a mesoroller. At this time, the opposite palm, sole, and armpit were set as the control group, and in the case of the control group, PBS instead of the solution containing the pentapeptide was applied with a mesoroller. After sufficient absorption and natural drying, iodine solution was applied to the same area with a sterile gauze pad and allowed to dry naturally. When the iodine solution was completely dry, corn starch was evenly applied on the iodine-coated area with cotton to form a starch layer. When sweat is secreted, iodine and starch dissolve and change color to blue-purple, so the color change over time was observed in the subject's palms, soles, or armpits. After image capture, intensity analysis was performed using Image J software.

Figure 4:
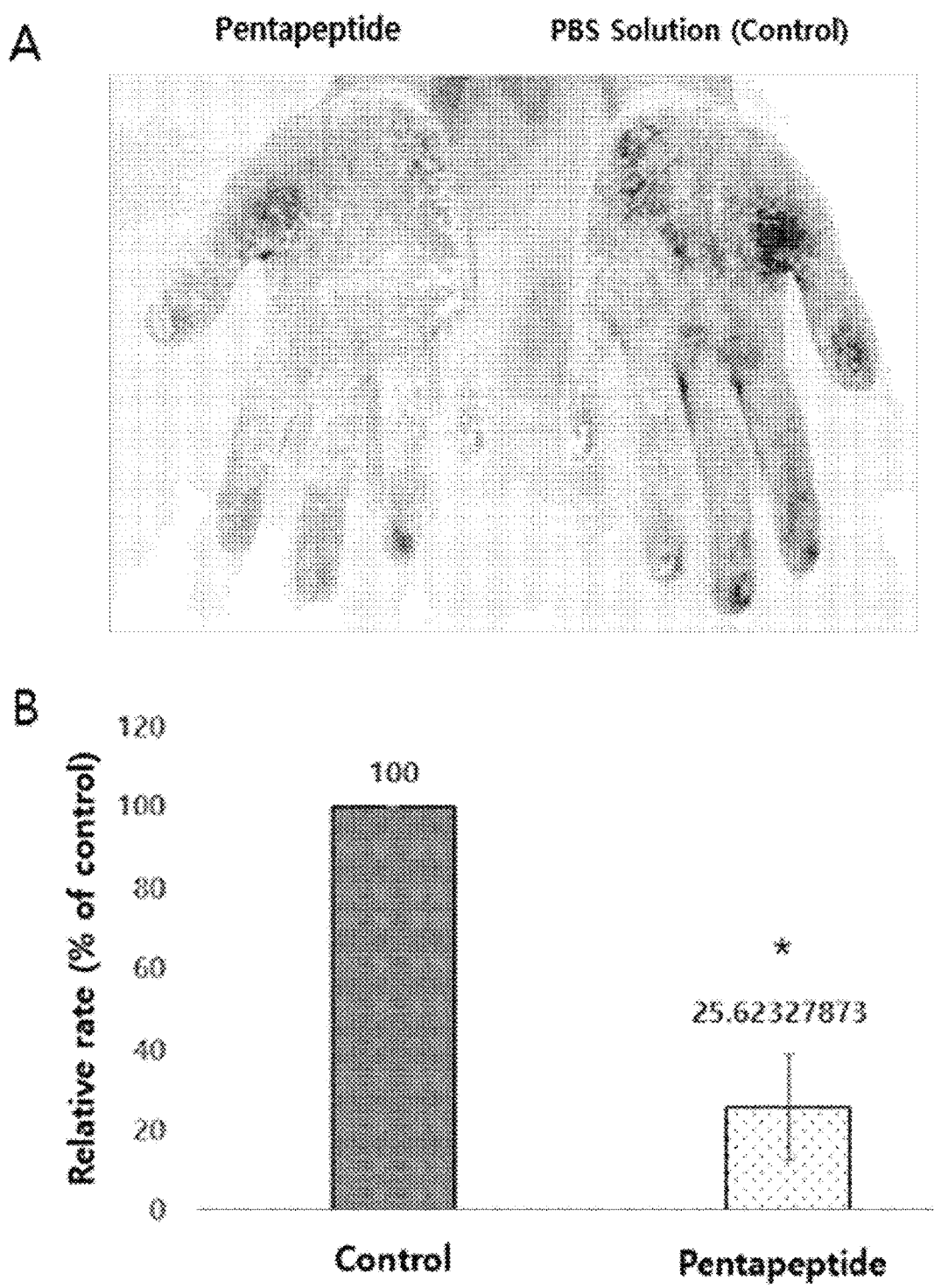
FIG. 4 shows the relative sweat reduction effect by treatment with the KFLIK peptide(SEQ ID NO: 1) of the present invention in the palm of the patient with hyperhidrosis: A is an image of the iodine-starch test result, and B shows the sweat reduction effect as the result of intensity analysis using image J software.
Figure 5:
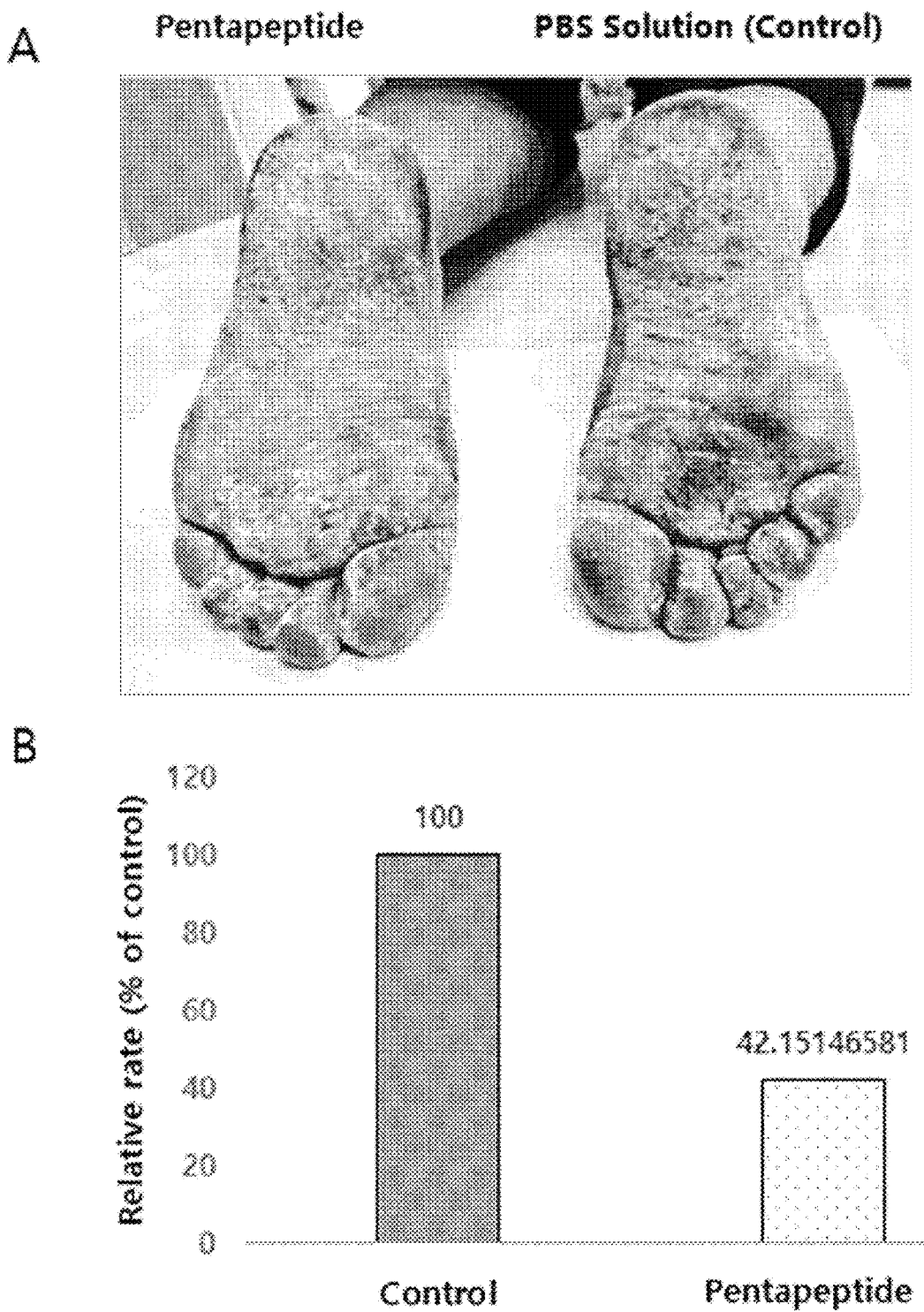
FIG. 5 shows the relative sweat reduction effect by treatment with the KFLIK peptide(SEQ ID NO: 1) of the present invention on the soles of patient with hyperhidrosis: A is an image of the iodine-starch test result, and B shows the sweat reduction effect as the result of intensity analysis using Image J software.
Figure 6:
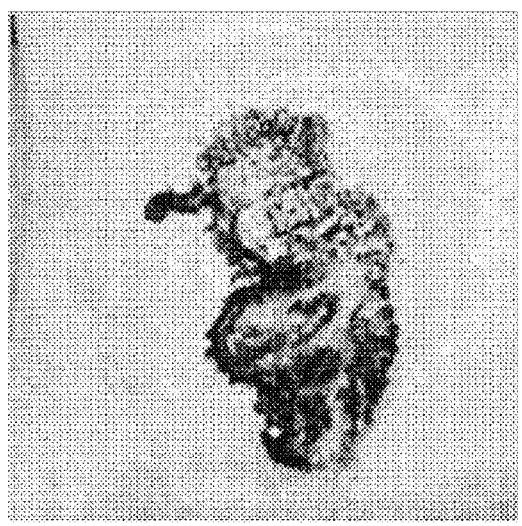
FIG. 6 shows the relative sweat reduction effect by treatment with the KFLIK peptide(SEQ ID NO: 1) of the present invention in the armpit of patient with hyperhidrosis: A is an image of the iodine-starch test result, and B shows the sweat reduction effect as the result of intensity analysis using Image J software.
Figure 6:
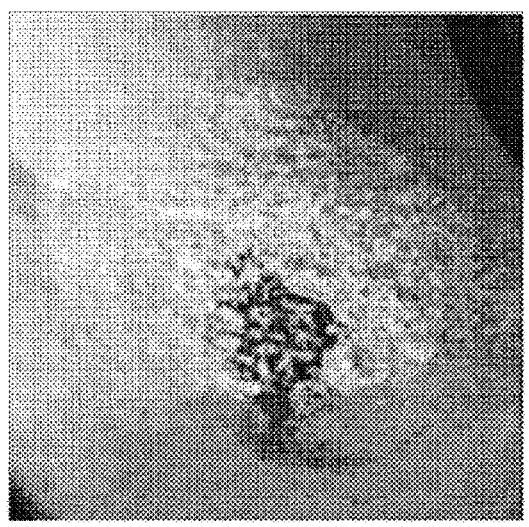
Figure 6:
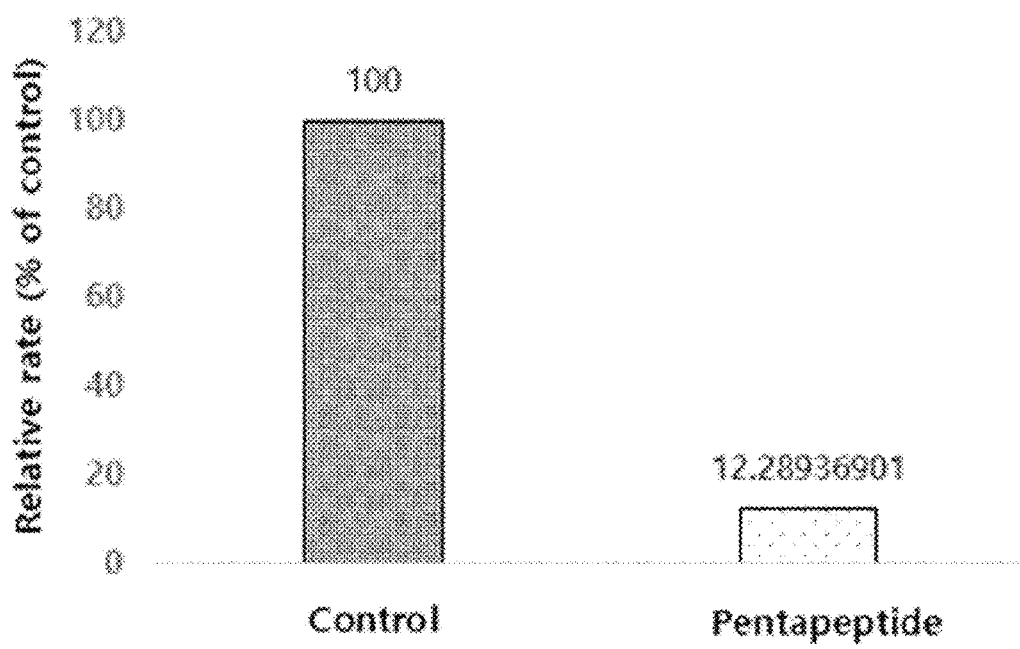

As a result, as shown in FIG. 4, it was confirmed that the amount of sweat secreted from the hands of the subjects who applied the lotion containing the pentapeptide of the present invention was reduced by about 74%. Further, as shown in FIG. 5, it was confirmed that the amount of sweat secreted from the soles of the subjects who applied the lotion containing the pentapeptide of the present invention was reduced by about 58%, and as shown in FIG. 6, it was confirmed that the amount of sweat secreted from the armpits of the subjects who applied the lotion containing the pentapeptide of the present invention was reduced by about 88%.

Through this, it can be seen that the pentapeptide of the present invention can provide a therapeutic effect in reducing sweating and preventing excessive sweat production just by applying it to the skin in patients with hyperhidrosis, thereby providing an effect of fundamentally blocking the occurrence of body odor.

Experimental Example 4

Confirmation of Intracellular or Skin Tissue Penetration Pattern 4-1. Preparation of Rhodamine-Pentapeptide Conjugate In order to confirm whether or not the peptide of the present invention penetrates cells or tissues, a rhodamine-pentapeptide conjugate conjugated with a fluorescent material was prepared. First, a 10 mg/ml pentapeptide solution was prepared using 100 mM sodium bicarbonate (pH 9.0), and a 1 mg/ml NHS-rhodamine (Thermo Scientific, 46406) solution was prepared using dimethylformamide. The prepared solutions were mixed so that pentapeptide:NHS-rhodamine=1:10(molar ratio). After shading, the solution was reacted at room temperature for 1 hour while inverting, the reactants were dialyzed, and then conjugation was confirmed by LC/MS.

4-2. Confirmation of Intracellular Penetration

In order to confirm that the pentapeptide of the present invention penetrates into the nerve cells, SH-SY5Y cells were seeded in a 6-well plate at a density of $3 \times 10^5$ cells/well and cultured in a 37° C., 5% $CO_2$ incubator for 24 hours, and then the medium was replaced with serum-free medium. After treatment with the rhodamine-peptide conjugate for 4 hours at each concentration, cells were fixed by treatment with 4% paraformaldehyde, and nuclei were stained using a DAPI staining kit (Invitrogen, USA). Intracellular peptide penetration was observed using a fluorescence microscope. Blue represents the nuclei of cells stained with DAPI, and red represents the 'rhodamine-pentapeptide' conjugate.

Figure 7:
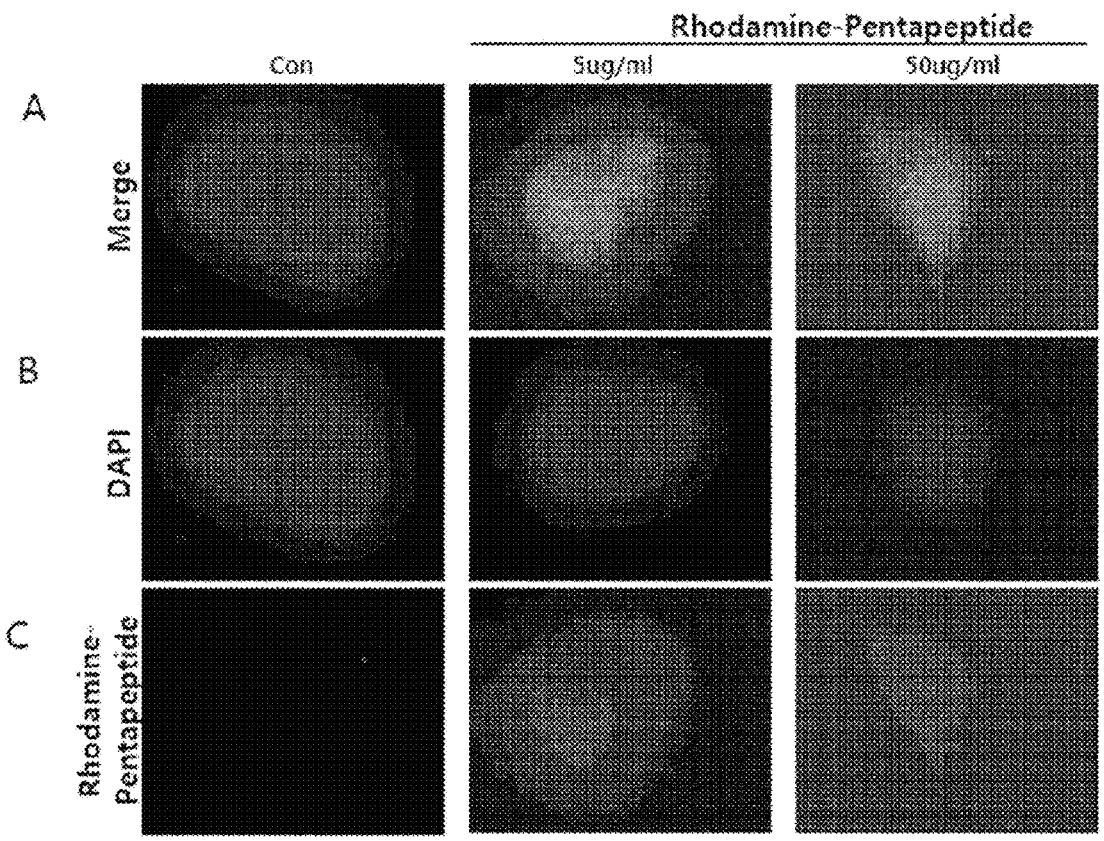
FIG. 7 is a florescence microscope image showing that the KFLIK peptide(SEQ ID NO: 1) penetrates into nerve cells by attaching rhodamine, a fluorescent substance, to the KFLIK peptide(SEQ ID NO: 1): A shows the coexistence of blue-stained neuronal nuclei and red rhodamine-pentapeptide, the blue color in B indicates DAPI-stained neuronal nuclei, and the red color in C indicates rhodamine-peptide.

As a result, as shown in FIG. 7, from the coexistence of blue and red colors, it was confirmed that the pentapeptide of the present invention penetrated into nerve cells.

4-3. Confirmation of Penetration into Tissue

After hair removal on the back of 7-week-old SD rats, the rhodamine-pentapeptide was applied thereto, and the rats were sacrificed for analysis after 1 hour. Skin tissue was collected from the application site and formalin fixation was performed for one day. After making paraffin blocks using fixed tissues and sectioning them, immunohistochemical staining was performed using the neuronal cell marker TrkB Ab (Cell signaling, USA). Then, nuclear staining was performed using a DAPI staining kit (Invitrogen, USA), and the pattern of peptide penetration into tissues was observed using a fluorescence microscope. Blue represents the nuclei of cells stained with DAPI, red represents the rhodamine-pentapeptide conjugate, and green represents TrkB (a nerve fiber marker).

Figure 8:
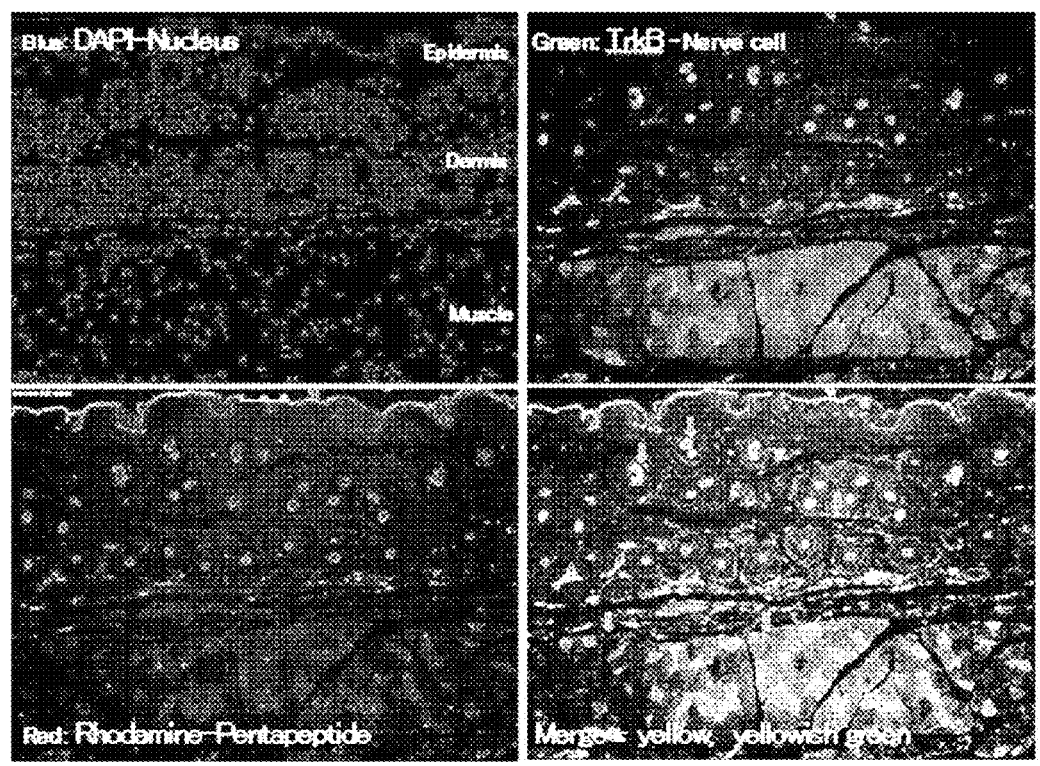
FIG. 8 is a fluorescence microscope image showing that the KFLIK peptide(SEQ ID NO: 1) penetrates into the muscle layer by collecting skin tissue after applying rhodamine-KFLIK(SEQ ID NO: 1) peptide to the back of the experimental animal: the blue color in A indicates DAPI-stained cell nuclei, the green color in B indicates TrkB neurofiber marker, the ted color in C indicates rhodamine-pentapeptide, and the yellow color in D indicates the penetration of the pentapeptide of the present invention into the nerve cells of the muscle layer.

As a result, as shown in FIG. 8, it was confirmed that the pentapeptide of the present invention penetrated into the muscle layer of the skin tissue and co-localized with the nerve cell marker.

Through this, it can be seen that since the pentapeptide of the present invention can penetrate into nerve cells, penetrates into the muscle layer of skin tissue through transdermal absorption, and coexists with nerve dell markers in the muscle layer, the pentapeptide can show the effect of suppressing sweat secretion and the effect of blocking the generation of body odor caused by sweat secretion.

Through this, it can be seen that since the pentapeptide of the present invention can penetrate into nerve cells, penetrates into the muscle layer of skin tissue through transdermal absorption, and coexists with nerve cell markers in the muscle layer, the pentapeptide can show the effect of suppressing the generation and transmission of pain by being involved in the inhibition of the expression of pro-inflammatory cytokines in muscle cells and the release of pain transmitters in nerve terminals.

Experimental Example 5

Confirmation of Body Odor Suppression Effect of Pentapeptide Using Body Odor-Causing Strains The antibacterial effect of the pentapeptide of the present invention was confirmed using *Corynebacterium*, which is known as a representative odor-causing bacterium that causes odor by decomposing substances contained in sweat.

Specifically, as a strain that causes body odor, *Corynebacterium xerosis* (*C. xerosis*, KCTC 9105) was purchased from the Korean Collection for Type Cultures and used. The strain was inoculated into brain heart infusion (Difco, USA) medium and cultured for 2 days in an incubator at 37° C. A diluted solution diluted to a concentration of $10^6$ CFU/ml by adding the same medium to the cultured strain was used as the test bacterial solution. After aliquoting 100 μL of the test bacterial solution in a 96 well plate, the pentapeptide was added by concentration. In a positive control group, 1% triclosan was added instead of the pentapeptide. After culturing for 48 hours, the absorbance at 600 nm was measured with a spectrophotometer to confirm the effect of inhibiting the proliferation of the odor-causing bacteria.

Figure 9:
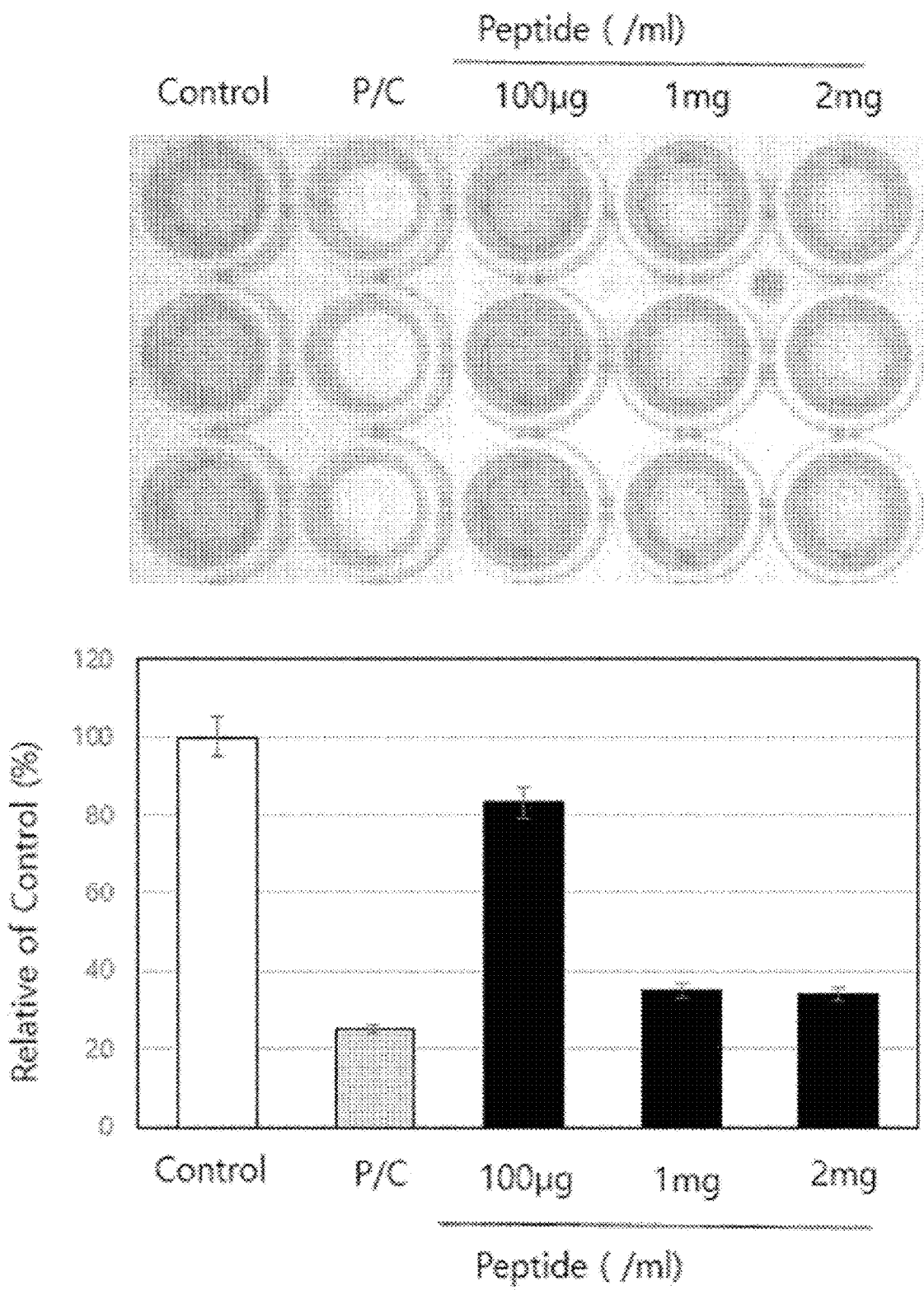
FIG. 9 shows the body odor inhibitory effect of the KFLIK peptide(SEQ ID NO: 1) of the present invention, and the growth inhibitory effect of *Corynebacterium* is shown as the absorbance measurement result using a spectrophotometer. P/C is 1% triclosan as a positive control.

As a result, as shown in FIG. 9, it was confirmed that when the pentapeptide of the present invention was treated, the proliferation of the body odor-causing strain was clearly inhibited. In particular, it was confirmed that in the group treated with 1 mg and 2 mg of the pentapeptide, the antibacterial effect was excellent at the same level as that of the positive control group.

Through this, it can be seen that the pentapeptide of the present invention can effectively inhibit the unique body odor generated during sweating by inhibiting the proliferation of the body odor-causing strain.

Experimental Example 6

Confirmation of Effect on Inhibiting Release of Pro-Inflammatory Cytokines by Pentapeptide Treatment in Myocytes 6-1. Confirmation of Expression Level of Pro-Inflammatory Cytokine Gene In order to confirm the pain improvement effect of the pentapeptide of the present invention, the expression pattern of inflammation-related cytokines was confirmed using mouse myoblasts. Pro-inflammatory cytokines are involved in pain in neuropathy, and when pro-inflammatory cytokines such as TNF-α are expressed after nerve damage, an inflammatory response is triggered and pain is caused.

Specifically, C2C12 cells, a mouse myoblast, were seeded in a 6-well plate at a density of $2 \times 10^5$ cells/well and then cultured in DMEM (10% PBS) medium for 3 days. The medium was replaced with differentiation medium (DMEM, 5% horse serum) when the cells were grown to about 70% to 80% of the plate, and cultured for 3 days. After replacing the medium with differentiation medium (DMEM, 2% horse serum), the cells were cultured for 4 days to induce differentiation from myoblasts to myotubes. Then, the medium was replaced with a serum-free medium and incubated for 2 hours, and 1 μM, 10 μM, and 100 μM of the pentapeptide was pretreated for 1 hour. Then, 20 nM of TNF-α was treated thereto and the cells were cultured for 24 hours to induce an inflammatory response.

Then, the cells were recovered, RNA was isolated, and cDNA was synthesized using a cDNA synthesis kit (Xntrcn, Korea). Polymerase chain reaction was performed using the synthesized cDNA, PCR premix (Intron, Korea) and IL-1α, TNF-α, IL-1β and COX-2 primers, and the amplified PCR product was electrophoresed on an agarose gel and check DNA bands to compare the mRNA expression level of the genes. The primer sequences used at this time are as shown in [Table 1].

TABLE 1

| Gene | Primer | Sequence (5'->3') | SEQ ID NO |
|------|--------|-------------------|-----------|
| IL-1α | F | GAA GTC AGG CAG AAG TGC TC | 2 |
|       | R | GTG CAC CCG ACT TTG TTC TT | 3 |
| TNF-α | F | CGT CAG CCG ATT TGC TAT CT | 4 |
|       | R | CGG ACT CCG CAA AGT CTA AG | 5 |
| IL-1β | F | CAA GGA GAA CCA AGC AAC GA | 6 |
|       | R | TTG GCC GAG GAC TAA GGA GT | 7 |
| COX-2 | F | TGA GTG GTA GCC AGC AAA GC | 8 |
|       | R | CTG CAG TCC AGG TTC AAT GG | 9 |
| GAPDH | F | ACCACAGTCCATGCCATCAC | 10 |
|       | R | TCCACCACCCTGTTGCTGTA | 11 |

Figure 10A:
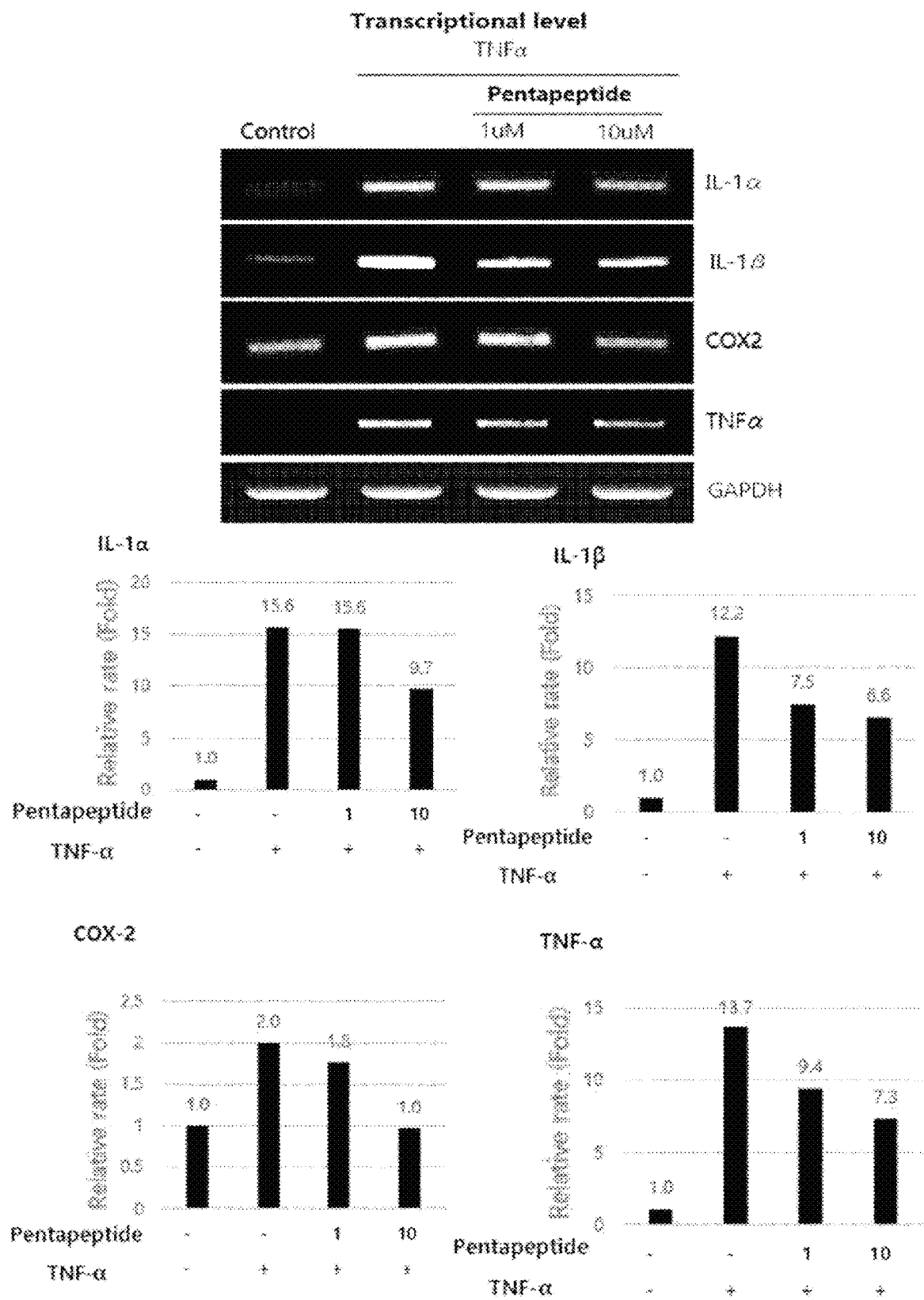
FIG. 10a and FIG. 10b show the effect of inhibiting the expression of pro-inflammatory cytokines by the KFLIK peptide (SEQ ID NO: 1) treatment in myocytes.

As a result, as shown in FIG. 10a, it was confirmed that in the case where inflammation was induced in the myotube by treatment with TNF-α, the mRNA expression levels of IL-1α, IL-1β, COX-2, and TNF-α, that is, the pro-inflammatory cytokine, were significantly increased compared to the untreated group (control). However, it was confirmed that in the cases of the treatment groups with 1 μM and 10 μM of the pentapeptide of the present invention, the increased pro-inflammatory cytokine was decreased.

6-2. Confirmation of Expression Level of Pro-Inflammatory Cytokine Protein

On the other hand, in order to confirm the expression level of inflammatory cytokine protein, for some of the cells recovered in 6-1(W.B.), the protein was quantified after cell lysate separation and mixed with a sample buffer to prepare a sample. The sample was developed on SDS-PAGE and nitrocellulose membrane and blocked with 5% skim milk.

COX-2 antibody (Cell Signaling Technology, USA), IL-1β antibody (Cell Signaling Technology, USA), and TNF-α antibody (Cell Signaling Technology, USA) were first bound thereto, and then the secondary antibody was bound. After treatment with the ECL solution, the expression level of the target protein was observed.

Figure 10B:
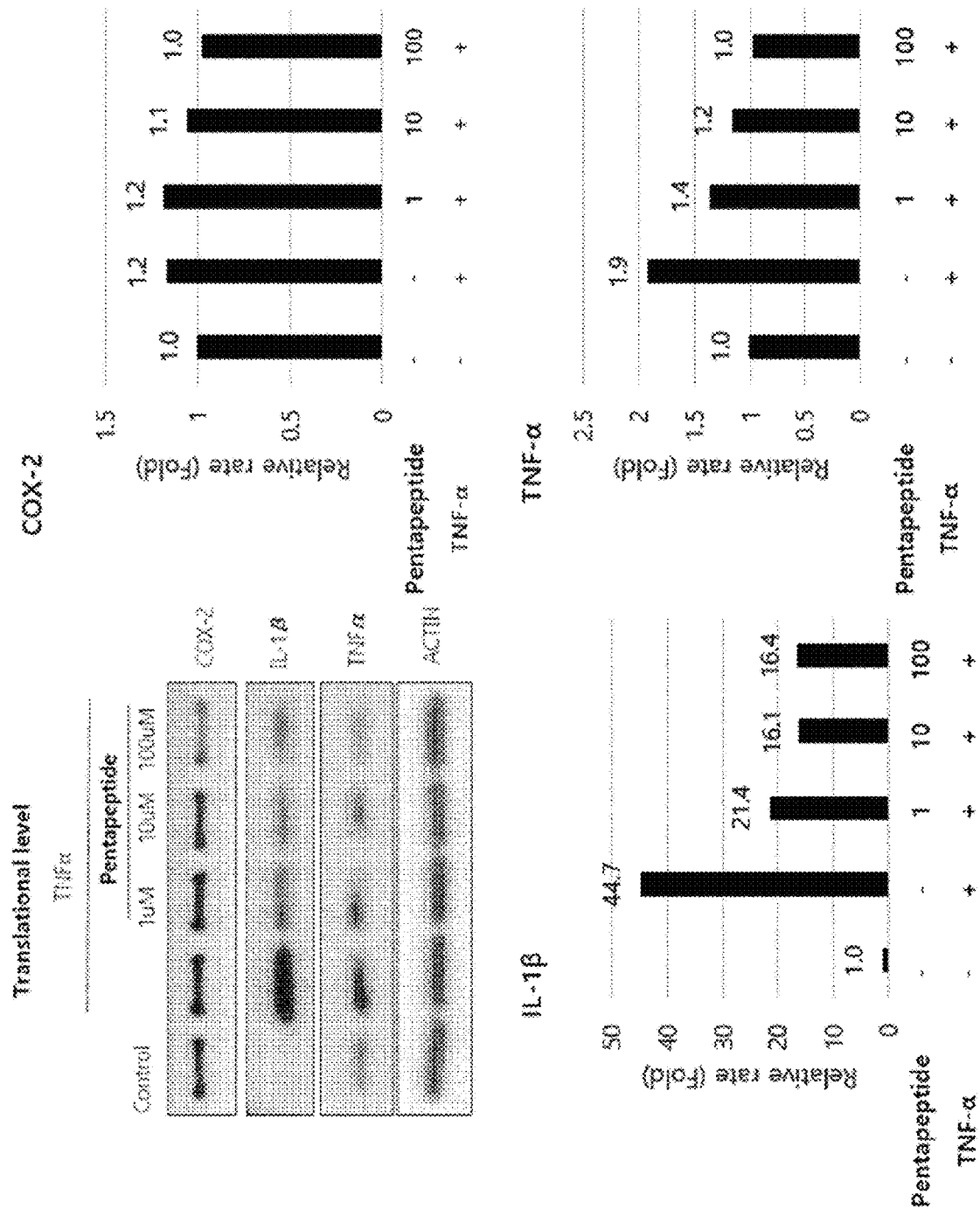

As a result, as shown in FIG. 10b, it was confirmed that when inflammation was induced in the myotube by treatment with TNF-α, the protein expression levels of COX-2, IL-1β, and TNF-α, that is, the amount of pro-inflammatory cytokine protein, were significantly increased compared to the untreated group (control). However, it was confirmed that in the case of the treatment group with the pentapeptide of the present invention, the increased expression of pro-inflammatory cytokines was decreased in a concentration-dependent manner.

Through this, it can be seen that since the pentapeptide of the present invention exhibits an effect on reducing the expression of IL-1α, IL-1β, COX-2, and TNF-α in myotubes, that is, the expression of pro-inflammatory cytokines at both the mRNA level and the protein level, it can be usefully used as a material for the prevention or treatment of pain.

Experimental Example 7

Confirmation of Inhibitory Effect on Neurotransmitter Release from Nerve Cells

In order to confirm the effect of the pentapeptide of the present invention on pain relief, the degree of release of substance P was confirmed at the synapse using mouse nerve cells. The substance P transmits pain from the periphery to the center, so if the release of substance P is suppressed, it can have a pain relief effect.

Specifically, dorsal root ganglion (DRG) was isolated from the spinal cord of 6-week-old rats and washed, and then nerve cells were isolated. After aliquoting the isolated nerve cells in a 24-well plate and culturing them for one day, the mitotic inhibitor was mixed with the medium in which the nerve cells were cultured, and only pure nerve cells were cultured for 6 days. Then, in order to add nutrients, the medium was replaced with B-27 medium (serum-free, 1% penicillin) and the cells were cultured for 24 hours, and then pre-treated with 1 μM and 10 μM of the pentapeptide for 1 hour. Then, 100 μM of capsaicin was treated for 30 minutes to induce the release of substance P, and the amount of the substance P released was analyzed by ELISA.

Figure 11:
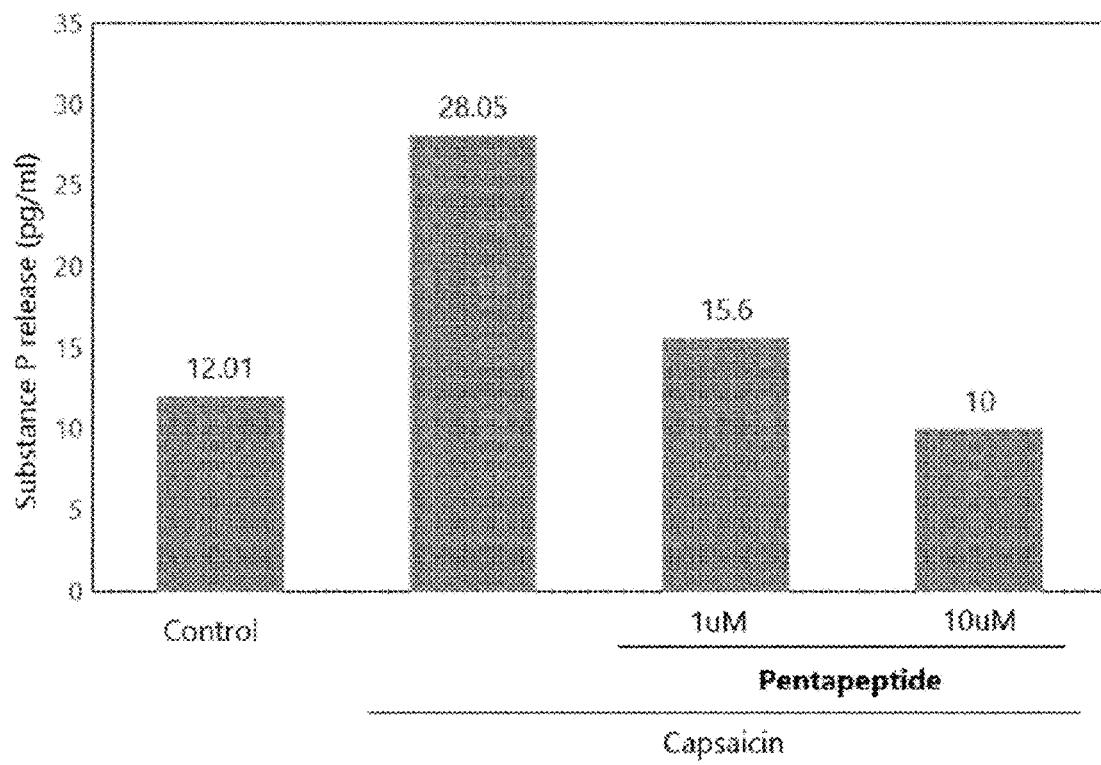
FIG. 11 shows the effect of inhibiting the release of substance P, a pain transmitter, by the KFLIK peptide (SEQ ID NO: 1) treatment in nerve cells.

As a result, as shown in FIG. 11, it was confirmed that when capsaicin was treated, the release of the substance P was increased compared to the untreated group (control), but the increased release of the substance P was significantly decreased in the case of the treatment group with the pentapeptide of the present invention.

Through this, it can be seen that the pentapeptide of the present invention can be usefully used as a material for the prevention or treatment of pain by inhibiting the release of substance P from nerve cells and preventing the transmission of pain signals.

Experimental Example 8

Confirmation of Pain Relief Effect of Pentapeptide Through Human Efficacy Evaluation In order to confirm whether the pentapeptide according to the present invention actually has the effect on suppressing pain, after inducing delayed onset muscle soreness in 20 subjects, the lotion containing the pentapeptide of the present invention was applied to the painful area to evaluate the human efficacy for pain relief.

Specifically, in order to induce delayed onset muscle soreness in the subjects, a total of 3 sets of exercise was performed in which the subject was asked to stand with both feet spread hip-width apart, with the back straight, and raise and lower the heels as much as possible for 2 minutes and then rest for 3 minutes. After 24 hours, a solution containing 2000 ppm of the pentapeptide of the present invention was applied to the painful area. Then, after 24, 48, and 72 hours, the Numeric Rating Scale (NRS) felt when walking was self-measured (0 is no pain, 10 is the most severe pain imaginable). The average value of pain intensity (Mean PID scores) was calculated using the following equation, and after the 72-hour test, the degree of pain relief was confirmed through the subject questionnaire.

Pain intensity difference (PID)=Pain intensity after application of the pentapeptide of the present invention−Pain intensity before application of the pentapeptide of the present invention    [Equation]

Figure 12A:
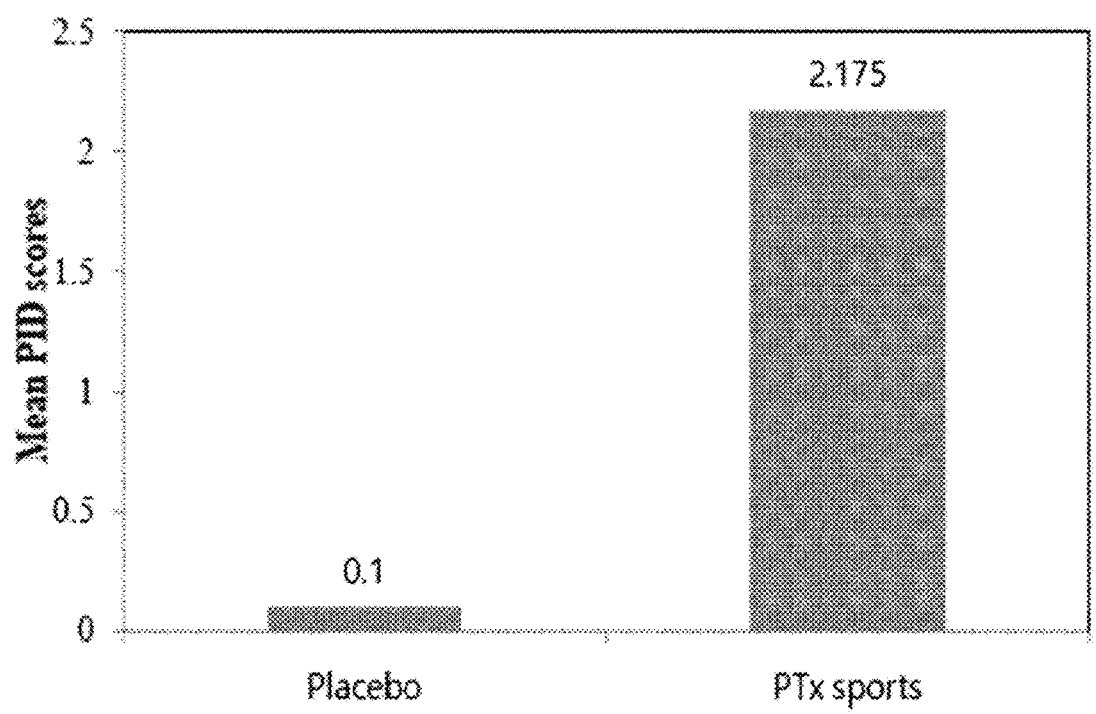
FIG. 12a and FIG. 12b show the muscle pain relief effect of the by the treatment of the KFLIK peptide(SEQ ID NO: 1) of the present invention through human efficacy evaluation.
Figure 12B:
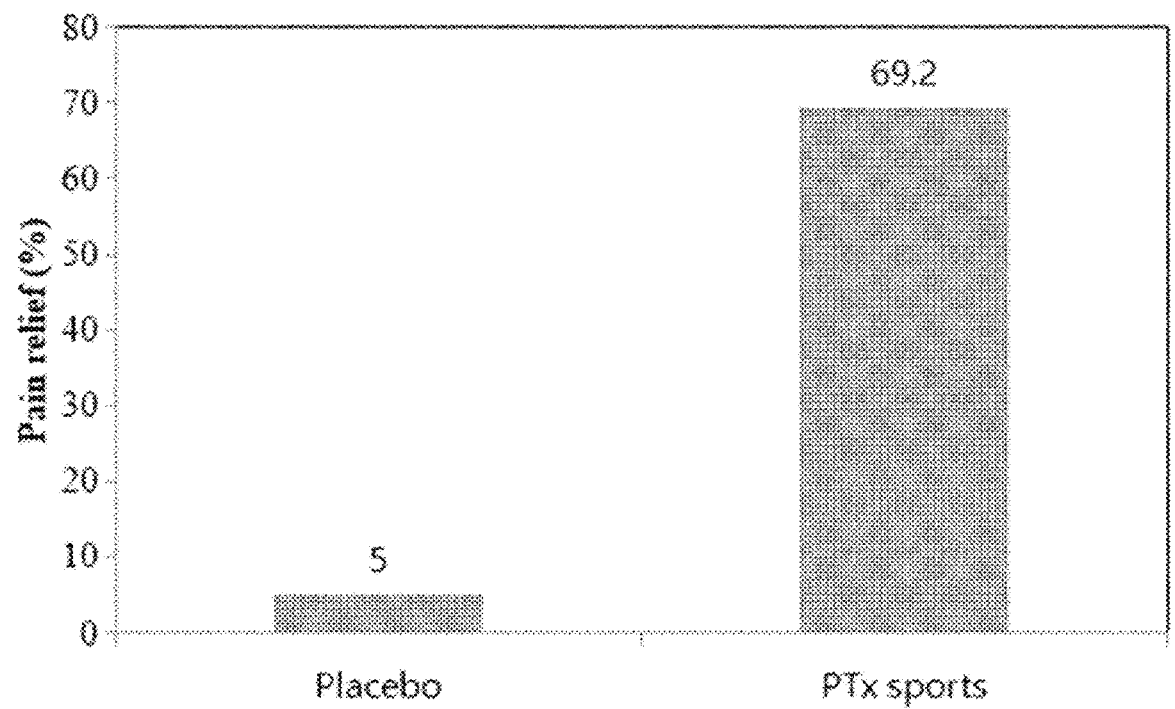

As a result, as shown in FIG. 12a and FIG. 12b, it was confirmed that the degree of pain induced after 24 hours from exercise was significantly improved after 72 hours from exercise (48 hours after lotion application) in the experimental group to which the pentapeptide of the present invention was applied.

Through this, it can be seen that the pentapeptide of the present invention can provide a therapeutic effect in reducing pain just by applying it to the skin of patients with muscle pain.

The invention claimed is:

1. A method of treating hyperhidrosis in a subject in need thereof, the method comprising administering to the subject a pharmaceutical composition comprising a pentapeptide consisting of the amino acid sequence of SEQ ID NO: 1 as an active ingredient.

2. The method according to claim 1, wherein the hyperhidrosis includes focal hyperhidrosis and generalized hyperhidrosis.

3. The method according to claim 1, wherein the hyperhidrosis occurs in any one skin area selected from the group consisting of the face, forehead, neck, hands, feet and armpits.

4. The method according to claim 1, wherein sweat production of a group administered with the pharmaceutical composition is reduced 45% to 90%, compared to a control group not administered with the pharmaceutical composition.

5. A method of alleviating hyperhidrosis or suppressing body odor in a subject in need thereof, the method comprising administering to the subject a composition comprising a pentapeptide consisting of the amino acid sequence of SEQ ID NO: 1 as an active ingredient.

6. The method according to claim 5, wherein the body odor is a bad odor caused by the breakdown products resulting from the breakdown of sweat gland secretions by bacteria.

7. The method according to claim 6, wherein the body odor is a bad odor from armpits, feet, hands, forehead, neck, face, or scalp.

8. The method of claim 5, wherein the administered composition comprises a cosmetic composition.

9. A method of alleviating pain in a subject in need thereof, the method comprising administering to the subject a composition comprising a pentapeptide consisting of the amino acid sequence of SEQ ID NO: 1 as an active ingredient.

10. The method according to claim 9, wherein the pentapeptide inhibits i) the expression of any one or more pro-inflammatory cytokines selected from the group consisting of IL-1α, IL-1β, COX-2 and TNF-α, and ii) the release of substance P, a pain transmitter.

11. The method according to claim 9, wherein the pain is any one or more selected from the group consisting of inflammatory pain, neuropathic pain, nociceptive pain and psychogenic pain.

12. The method according to claim 9, wherein the pain is pain concomitant with any one selected from the group consisting of sprains in the knee, elbow, finger, shoulder, ankle or foot area, bruises, joint pain, tendon inflammation, ligament inflammation, frozen shoulder, rotator cuff disease, tennis elbow, golf elbow and de Quervain syndrome.

13. The method according to claim 9, wherein the pain is at least one selected from the group consisting of postoperative pain, cancer pain, trigeminal neuralgia pain, idiopathic pain, diabetic neuropathic pain, muscle pain, migraine, menstrual pain and arthritis pain.

14. A method of treating pain in a subject in need thereof, the method comprising administering to the subject a pharmaceutical composition comprising a pentapeptide consisting of the amino acid sequence of SEQ ID NO: 1.

15. The method of claim 9, wherein the composition comprises a cosmetic composition.

* * * * *